(12) United States Patent
Arai et al.

(10) Patent No.: US 8,722,831 B2
(45) Date of Patent: May 13, 2014

(54) PROCESS FOR PRODUCTION OF CROSS COPOLYMERS, CROSS COPOLYMERS OBTAINED BY THE PROCESS, AND USE THEREOF

(75) Inventors: Toru Arai, Machida (JP); Masaru Hasegawa, Machida (JP); Ayumu Tsukamoto, Machida (JP); Akira Miyama, Machida (JP); Shigeru Suzuki, Ichihara (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 856 days.

(21) Appl. No.: 12/302,818

(22) PCT Filed: May 29, 2007

(86) PCT No.: PCT/JP2007/060917
§ 371 (c)(1),
(2), (4) Date: Dec. 1, 2008

(87) PCT Pub. No.: WO2007/139116
PCT Pub. Date: Dec. 6, 2007

(65) Prior Publication Data
US 2009/0263604 A1 Oct. 22, 2009

(30) Foreign Application Priority Data

May 29, 2006 (JP) .................. 2006-147991
Oct. 23, 2006 (JP) .................. 2006-288070
May 10, 2007 (JP) .................. 2007-125496

(51) Int. Cl.
C08F 212/06 (2006.01)
C08F 4/76 (2006.01)
C08F 4/48 (2006.01)
C08J 9/00 (2006.01)

(52) U.S. Cl.
USPC .......... 526/347; 526/170; 526/173; 526/348; 525/241; 525/240; 521/139

(58) Field of Classification Search
USPC .............. 526/347, 348, 170, 173; 428/36; 525/241, 240; 521/139
See application file for complete search history.

(56) References Cited

U.S. PATENT DOCUMENTS

| | | | |
|---|---|---|---|
| 5,332,788 A | 7/1994 | Yokoyama et al. | |
| 5,883,213 A | 3/1999 | Arai et al. | |
| 6,066,709 A | 5/2000 | Arai et al. | |
| 6,235,855 B1 | 5/2001 | Arai et al. | |
| 6,248,850 B1 | 6/2001 | Arai | |
| 6,329,479 B1 | 12/2001 | Arai et al. | |
| 6,348,556 B1 | 2/2002 | Arai et al. | |
| 6,355,344 B1 | 3/2002 | Mamish et al. | |
| 6,410,649 B1 | 6/2002 | Oda et al. | |
| 6,410,673 B1 | 6/2002 | Arai et al. | |
| 6,417,308 B2 | 7/2002 | Arai et al. | |
| 6,472,490 B1 | 10/2002 | Arai et al. | |
| 6,489,424 B2 | 12/2002 | Arai et al. | |
| 6,559,234 B1 * | 5/2003 | Arai et al. | 525/245 |
| 6,566,453 B1 | 5/2003 | Arai et al. | |
| 6,630,215 B1 | 10/2003 | Oda et al. | |
| 6,803,422 B2 | 10/2004 | Arai et al. | |
| 6,878,779 B2 | 4/2005 | Arai et al. | |
| 6,891,004 B2 | 5/2005 | Arai et al. | |
| 7,022,794 B2 | 4/2006 | Arai et al. | |
| 7,160,949 B2 * | 1/2007 | Ota et al. | 525/242 |
| 7,214,745 B2 | 5/2007 | Arai et al. | |
| 2003/0055179 A1 | 3/2003 | Ota et al. | |
| 2003/0096926 A1 | 5/2003 | Arai et al. | |

FOREIGN PATENT DOCUMENTS

| | | | |
|---|---|---|---|
| JP | 5 39331 | | 2/1993 |
| JP | 05039331 A | * | 2/1993 |
| JP | 5 125194 | | 5/1993 |
| JP | 05125194 A | * | 5/1993 |
| JP | 2623070 | | 4/1997 |
| JP | 9 309925 | | 12/1997 |
| JP | 11 130808 | | 5/1999 |
| JP | 2001-316431 | | 11/2001 |
| JP | 2001 348413 | | 12/2001 |
| JP | 2002-003553 | | 1/2002 |
| WO | 00 37517 | | 6/2000 |

OTHER PUBLICATIONS

U.S. Appl. No. 12/988,101, filed Oct. 15, 2010, Arai, et al.
U.S. Appl. No. 12/302,751, filed Nov. 26, 2008, Hasumi, et al.

* cited by examiner

Primary Examiner — Kelechi Egwim
(74) Attorney, Agent, or Firm — Oblon, Spivak, McClelland, Maier & Neustadt, L.L.P.

(57) ABSTRACT

To provide a novel cross copolymer and resin composition which are improved in heat resistance and compatibility over conventional ethylene/aromatic vinyl compound copolymers and which have low crystallinity, are excellent in softness, transparency and compatibility and show mechanical properties similar to soft vinyl chloride resins, as compared with conventional cross copolymers.

A process for producing a cross copolymer, which comprises a coordination polymerization step and a subsequent anionic polymerization step, wherein in the coordination polymerization step, copolymerization of an olefin monomer, an aromatic vinyl compound monomer and an aromatic polyene is carried out by using a single-site coordination polymerization catalyst to synthesize an olefin/aromatic vinyl compound/aromatic polyene copolymer, and then, in the anionic polymerization step, polymerization is carried out in the coexistence of such an olefin/aromatic vinyl compound/aromatic polyene copolymer and an anionic polymerizable vinyl compound monomer by using an anionic polymerization initiator.

24 Claims, 2 Drawing Sheets

200nm

PROCESS FOR PRODUCTION OF CROSS COPOLYMERS, CROSS COPOLYMERS OBTAINED BY THE PROCESS, AND USE THEREOF

TECHNICAL FIELD

The present invention relates to a specific copolymer excellent in softness or excellent in softness and transparency, and its composition and use.

BACKGROUND ART

An ethylene/styrene (aromatic vinyl compound) copolymer is known (Patent Document 1). Such a copolymer shows characteristics as an elastomer and further, it shows mechanical properties similar to soft vinyl chloride resins and has functional properties such as oil resistance and scratch or abrasion resistance. Further, an ethylene/styrene copolymer is also known wherein the alternating structure of ethylene and styrene contained in the copolymer has an isotactic stereoregularity (Patent Documents 2 and 3). As compared with a copolymer having no such a stereoregularity, this copolymer has restrictive crystallinity (microcrystallinity) based on the alternating structure and thus has characteristics such that the mechanical properties are further improved, and functions such as heat resistance and oil resistance are improved.

However, the above ethylene/styrene copolymers are statistic copolymers (so-called random copolymers), of which the copolymerization type may be described by Bernoulli, primary or secondary Markov statistics and thus have had drawbacks such that they are inherently deficient in heat resistance and also deficient in compatibility with e.g. a styrene type polymer. Further, although their mechanical properties are more similar to soft vinyl chloride resins than an olefinic polymer such as LLDPE (linear low density polyethylene), mechanical properties more similar to soft vinyl chloride resins are desired.

Therefore, a method for producing a so-called cross copolymer has been proposed, which is a method of copolymerizing a small amount of divinylbenzene to the ethylene/styrene copolymer to introduce dissimilar polymer chains by anionic polymerization via vinyl groups of divinylbenzene units (Patent Document 4). By this method, a styrene monomer in the polymerization solution may simply be taken into the polymer at a high conversion ratio, thereby to present a polymerization method having a very high efficiency. Further, the polymer (cross copolymer) thereby obtainable has heat resistance improved over the ethylene/styrene copolymer. However, each of the cross copolymers disclosed in Examples, has a polyethylene crystallinity and crystalline melting point, whereby the softness is substantially lost as compared with the ethylene/styrene copolymer. Further, the transparency is also substantially deteriorated as compared with the ethylene/styrene copolymer, and it is substantially opaque.

Patent Document 1: Japanese Patent No. 2,623,070
Patent Document 2: JP-A-9-309925
Patent Document 3: JP-A-11-130808
Patent Document 4: JP-A1-00/037517

DISCLOSURE OF THE INVENTION

Object to be Accomplished by the Invention

It is an object of the present invention to provide a novel cross copolymer which is improved in heat resistance and compatibility over the conventional ethylene/aromatic vinyl compound copolymers and which further has low crystallinity and is excellent in softness, transparency and compatibility, as compared with the conventional cross copolymers, and to provide a resin composition thereof.

Means to Accomplish the Object

The present invention provides a process for producing a cross copolymer, which comprises a coordination polymerization step and a subsequent anionic polymerization step, wherein in the coordination polymerization step, copolymerization of an olefin monomer, an aromatic vinyl compound monomer and an aromatic polyene is carried out by using a single-site coordination polymerization catalyst to synthesize an olefin/aromatic vinyl compound/aromatic polyene copolymer having an aromatic vinyl compound unit content of from 15 mol % to 40 mol %, an aromatic polyene unit content of from 0.01 mol % to 3 mol % and the rest being an olefin unit content, and then, in the anionic polymerization step, polymerization is carried out in the coexistence of such an olefin/aromatic vinyl compound/aromatic polyene copolymer and an anionic polymerizable vinyl compound monomer by using an anionic polymerization initiator.

Further, the present invention provides a soft cross copolymer having a type A hardness of from 50 to 85, obtainable by such a process.

Furthermore, the present invention provides a transparent cross copolymer obtainable by such a specific process of the present invention, of which a sheet having a thickness of 1 mm has a haze of at most 25%.

Effects of the Invention

The cross copolymer obtainable by the process of the present invention has characteristics such that it is excellent in heat resistance and compatibility as compared with conventional ethylene/aromatic vinyl compound copolymers, and it is excellent in softness as compared with conventional cross copolymers and further excellent in transparency.

BEST MODE FOR CARRYING OUT THE INVENTION

Figure 1:
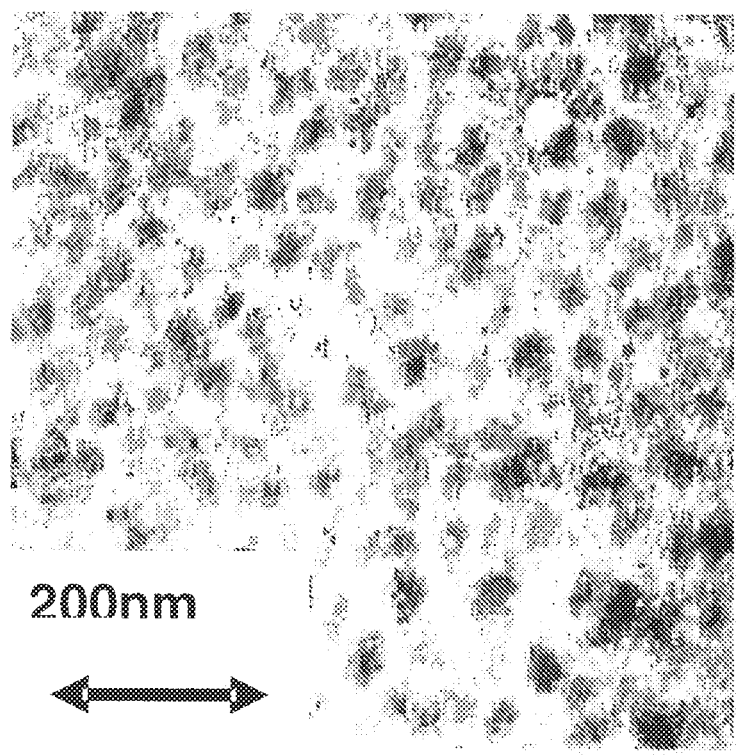
FIG. 1 is a TEM photograph of a cross copolymer obtained in Example 4 (a film press-formed at 180° C. was used).

The process for producing a cross copolymer of the present invention is a process for producing a cross copolymer, which comprises a coordination polymerization step and a subsequent anionic polymerization step, wherein in the coordination polymerization step, copolymerization of an olefin monomer, an aromatic vinyl compound monomer and an aromatic polyene is carried out by using a single-site coordination polymerization catalyst to synthesize an olefin/aromatic vinyl compound/aromatic polyene copolymer having an aromatic vinyl compound unit content of from 15 mol % to 40 mol %, preferably from 20 mol % to 40 mol %, an aromatic polyene unit content of from 0.01 mol % to 3 mol %, preferably from 0.01 mol % to 0.5 mol %, and the rest being an olefin unit content, and then, in the anionic polymerization step, polymerization is carried out in the coexistence of such an olefin/aromatic vinyl compound/aromatic polyene copolymer and an anionic polymerizable vinyl compound monomer by using an anionic polymerization initiator.

The cross copolymer obtainable by this process is considered to contain a structure (cross copolymer structure or segregated star copolymer structure) wherein a polymer chain constituted by the anionic polymerizable monomer is bonded as a cross chain to the olefin/aromatic vinyl compound/aromatic polyene copolymer as the main chain via the aromatic polyene unit of the main chain. However, the structure of the cross copolymer or the proportion contained is optional, and the cross copolymer of the present invention is defined to be a copolymer (polymer) obtainable by the process of the present invention.

When the composition of the olefin/aromatic vinyl compound/aromatic polyene copolymer obtainable in the coordination polymerization step satisfies the condition of "an aromatic vinyl compound unit content of from 15 mol % to 40 mol %, an aromatic polyene unit content of from 0.01 mol % to 3 mol %, and the rest being an olefin unit content", it is possible to obtain a cross copolymer which contains an olefin chain structure and has excellent softness with the total crystalline melting heat being not higher than a certain level. The composition of the olefin/aromatic vinyl compound/aromatic polyene copolymer can be controlled to be within the above range by a known common method, but most simply, by adjusting the compositional ratio of the monomer charge or by adjusting the olefin (ethylene) partial pressure.

If a crystalline structure derived from an olefin chain structure, such as a crystalline structure based on an ethylene chain or a propylene chain, is present in an amount higher than a certain level, the softness may sometimes be impaired, and further the dimensional stability of a formed product may sometimes be impaired due to e.g. shrinkage by crystallization during the forming processing. The cross copolymer obtainable by the present invention has a total crystalline melting heat of at most 40 J/g, preferably at most 30 J/g including the olefin crystallinity and other crystallinities. The total crystalline melting heat can be obtained from the total of peak areas attributable to the melting points observed within a range of from 50° C. to 150° C. by DSC (differential scanning calorimetry).

If the aromatic vinyl compound unit content in the olefin/aromatic vinyl compound/aromatic polyene copolymer obtained in the coordination polymerization step is less than 15 mol %, crystallization based on the ethylene chain structure takes place, the crystalline melting heat tends to be high, and the softness or the dimensional stability during the forming processing tends to be impaired. On the other hand, if the aromatic vinyl compound unit content exceeds 40 mol %, the glass transition temperature of the finally obtainable cross copolymer tends to be high, whereby the low temperature characteristics tend to deteriorate, or the softness at room temperature tends to be impaired, such being undesirable.

Further, the process of the present invention is characterized in that the mass proportion of the olefin/aromatic vinyl compound/aromatic polyene copolymer obtainable in the coordination polymerization step, is preferably from 40 mass % to 90 mass %, more preferably from 50 mass % to 90 mass %, most preferably from 55 mass % to 90 mass %, based on the mass of the cross copolymer finally obtainable via the anionic copolymerization step. The cross copolymer obtainable by the process of the present invention preferably has a type A hardness of from 50 to 85, particularly preferably a type A hardness of from 60 to 85. The mass proportion of the olefin/aromatic vinyl compound/aromatic polyene copolymer obtainable in the coordination polymerization step may be controlled, for example, by monitoring the ethylene consumption or the polymer concentration or composition thereby calculating the mass of the copolymer formed in the polymerization step. In order to lower the mass proportion, for example, the above monitoring is carried out, and the time for the coordination polymerization step is shortened while calculating the mass of the formed copolymer to initiate the anionic polymerization step at an early stage, and in order to increase the mass proportion, the polymerization time is prolonged to delay the initiation of the anionic polymerization step. Further, the anionic polymerizable vinyl compound monomer to be used in the anionic polymerization step may be added at the initiation of the anionic polymerization step or may be additionally added during the step. By the additional addition of the anionic polymerizable vinyl compound, the mass proportion of the olefin/aromatic vinyl compound/aromatic polyene copolymer obtainable in the coordination polymerization step can be optionally changed.

Further, the process of the present invention is a process for producing a cross copolymer, wherein the olefin/aromatic vinyl compound/aromatic polyene copolymer obtainable in the coordination polymerization step has a weight average molecular weight of from 30,000 to 150,000, and such a copolymer is employed. A transparent cross copolymer obtainable by the process of the present invention has a haze of a sheet having a thickness of 1 mm being at most 25% and a total light transmittance of at least 75%. The weight average molecular weight of the olefin/aromatic vinyl compound/aromatic polyene copolymer obtainable in the coordination polymerization step can be controlled by a known method, but it can usually be controlled by optionally adjusting the polymerization temperature.

Further, in the process of the present invention, in addition to the use of the olefin/aromatic vinyl compound/aromatic polyene copolymer having a weight average molecular weight of from 30,000 to 150,000, obtainable in the coordination polymerization step, by satisfying the condition such that the composition of the olefin/aromatic vinyl compound/aromatic polyene copolymer obtainable in the coordination polymerization step has an aromatic vinyl compound unit content of from 20 mol % to 40 mol %, an aromatic polyene unit content of from 0.01 mol % to 3 mol % and the rest being an olefin unit content, it is possible to obtain a transparent cross copolymer which is further excellent in transparency, of which a sheet having a thickness of 1 mm has a haze of at most 20%, or which has a total light transmittance of at least 81%.

Further, the aromatic polyene unit content of the olefin/aromatic vinyl compound/aromatic polyene copolymer obtainable in the coordination polymerization step in the above-mentioned process of the present invention is from 0.01 mol % to 3 mol %. If it is less than 0.01 mol %, the characteristics as the cross copolymer tend to be inadequate, and if it exceeds 3 mol %, the forming processability tends to be poor. In consideration of the mechanical properties and forming processability (which can be evaluated by the flowability or MFR (melt flow rate)) of the finally obtainable cross copolymer, a preferred aromatic polyene unit content is from 0.01 mol % to 0.5 mol %, and the most preferred aromatic polyene unit content is from 0.02 mol % to 0.2 mol %. Further, in a case where the aromatic polyene unit content is within a range of from 0.02 mol % to 0.2 mol %, the functionality of the olefin/aromatic vinyl compound/aromatic polyene copolymer as the main chain will be sufficiently utilized for the physical properties of the cross copolymer, such being desirable. If the aromatic polyene unit content exceeds 0.2 mol %, the average chain length between the aromatic polyene units in the main chain tends to be short, and there may be a case where the functionality of the olefin/aromatic vinyl compound/aromatic polyene copolymer as the main chain may not sufficiently be utilized.

Further, the cross copolymer obtainable by the process of the present invention shows good compatibility with an aromatic ring type polymer such as polystyrene or propylene type polymer, and it may be mixed therewith to form a composition thereby to improve the physical properties of such polymers or to use it as a compatibilizing agent.

Now, the process of the present invention will be described in detail.

Coordination Polymerization Step

In the coordination polymerization step in the process of the present invention, a single-site coordination polymerization catalyst is used. Preferably, a single-site coordination polymerization catalyst comprising a transition metal compound of the following formula (1) or (6) and a co-catalyst is used.

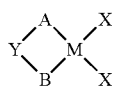

Formula (1)

wherein each of A and B which may be the same or different, is an unsubstituted or substituted cyclopentaphenanthryl group, an unsubstituted or substituted benzoindenyl group, an unsubstituted or substituted cyclopentadienyl group, an unsubstituted or substituted indenyl group, or an unsubstituted or substituted fluorenyl group, where the substituted cyclopentaphenanthryl group, the substituted benzoindenyl group, the substituted cyclopentadienyl group, the substituted indenyl group, or the substituted fluorenyl group, is a cyclopentaphenanthryl group, a benzoindenyl group, a cyclopentadienyl group, an indenyl group, or a fluorenyl group, having at least one substitutable hydrogen atom substituted by a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group).

Preferably, in the formula, A and B may be the same or different, and at least one of A and B is a group selected from unsubstituted or substituted benzoindenyl groups of the formulae (2), (3) and (4) and an unsubstituted or substituted indenyl group of the formula (5). Most preferably, in the formula, A and B may be the same or different, and each of A and B is a group selected from unsubstituted or substituted benzoindenyl groups of the formulae (2), (3) and (4) and an unsubstituted or substituted indenyl group of the formula (5).

In the following formulae (2), (3) and (4), each of $R_1$ to $R_3$ which are independent of one another, is hydrogen, a $C_{1-20}$ alkyl group, a $C_{6-20}$ aryl group, $C_{7-20}$ alkylaryl group, a halogen atom, a $OSiR_3$ group, a $SiR_3$ group or a $PR_2$ group (wherein each R is a $C_{1-10}$ hydrocarbon group). The plurality of each of $R_1$, $R_2$ and $R_3$ may be the same or different from one another, and adjacent two $R_1$ or $R_2$ may together form a 5- to 8-membered aromatic or aliphatic ring.

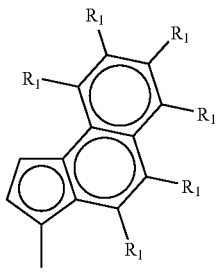

Formula (2)

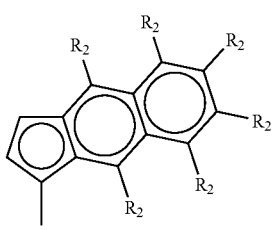

Formula (3)

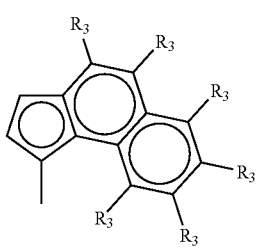

Formula (4)

The unsubstituted benzoindenyl groups of the above formulae may, for example, be a 4,5-benzo-1-indenyl group (another name: benzo(e)indenyl group), a 5,6-benzo-1-indenyl group and a 6,7-benzo-1-indenyl group and the substituted benzoindenyl groups may, for example, be α-acenaphtho-1-indenyl group, a 3-cyclopenta[c]phenanthryl group and a 1-cyclopenta[1]phenanthryl group. In the following formula (5), each $R_4$ is hydrogen, a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group). The plurality of $R_4$ may be the same or different from one another.

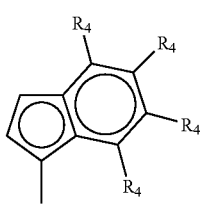

Formula (5)

The unsubstituted indenyl group of the above formula may, for example, be a 1-indenyl group, and the substituted indenyl group may, for example, be a 4-methyl-1-indenyl group, a 5-ethyl-1-indenyl group, a 4-phenyl-1-indenyl group, or a 4-naphthyl-1-indenyl group.

More preferably, in the formula, A and B may be the same or different, and each of them is a group selected from the unsubstituted or substituted benzoindenyl groups of the formulae (2), (3) and (4) and the unsubstituted or substituted indenyl group of the formula (5).

Y is a methylene group, a silylene group, an ethylene group, a germylene group or a boron group, which has bonds to A and B and which further has, as a substituent, hydrogen or a $C_{1-15}$ hydrocarbon group (this substituent may contain from 1 to 3 nitrogen, oxygen, sulfur, phosphorus or silicon atoms); such substituents may be the same or different from one another; and Y may have a cyclic structure.

Preferably, Y is a methylene group or a boron group which has bonds to A and B and which further has, as a substituent, hydrogen or a $C_{1-15}$ hydrocarbon group (this substituent may contain from 1 to 3 nitrogen, oxygen, sulfur, phosphorus or silicon atoms).

X is hydrogen, a hydroxyl group, a halogen, a $C_{1-20}$ hydrocarbon group, a $C_{1-20}$ alkoxy group, a silyl group having a $C_{1-4}$ hydrocarbon group, or an amido group having a $C_{1-20}$ hydrocarbon group; and the two X may have a bond.

M is zirconium, hafnium or titanium.

Further, such a transition metal compound is preferably a racemic modification. Suitable examples of such a transition metal compound may be transition metal compounds having substituted methylene-crosslinked structures as specifically exemplified in EP-0872492A2, JP-A-11-130808 and JP-A-9-309925, or transition metal compounds having boron-crosslinked structures as specifically exemplified in WO01/068719.

Further, a transition metal compound of the following formula (6) may also be suitably used.

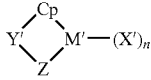

Formula (6)

wherein Cp is an unsubstituted or substituted cyclopentaphenanthryl group, an unsubstituted or substituted benzoindenyl group, an unsubstituted or substituted cyclopentadienyl group, an unsubstituted or substituted indenyl group, or an unsubstituted or substituted fluorenyl group, where the substituted cyclopentaphenanthryl group, the substituted benzoindenyl group, the substituted cyclopentadienyl group, the substituted indenyl group, or the substituted fluorenyl group, is a cyclopentaphenanthryl group, a benzoindenyl group, a cyclopentadienyl group, an indenyl group, or a fluorenyl group, having at least one substitutable hydrogen atom substituted by a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group).

Y' is a methylene group, a silylene group, an ethylene group, a germylene group or a boron group, which has bonds to Cp and Z and which further has, as a substituent, hydrogen or a $C_{1-15}$ hydrocarbon group. Such substituents may be the same or different from one another. And Y' may have a cyclic structure.

Z is a group which is a ligand containing nitrogen, oxygen or sulfur and coordinated with M' by the nitrogen, oxygen or sulfur, and which has a bond to Y' and further has hydrogen or a $C_{1-15}$ substituent.

M' is zirconium, hafnium or titanium.

X' is hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group, or a dialkylamido group having a $C_{1-6}$ alkyl substituent.

n is an integer of 1 or 2.

Such transition metal compounds as represented by the formula (6) are disclosed in WO99/14221, EP416815 and U.S. Pat. No. 6,254,956.

In the coordination polymerization step in the process of the present invention, more preferably, a single-site coordination polymerization catalyst comprising a transition metal compound of the above formula (1) and a co-catalyst, is used. As the co-catalyst to be used in the coordination polymerization step in the process of the present invention, a known co-catalyst which has been used in combination with a conventional transition metal compound, may be used. As such a co-catalyst, an alumoxane such as methyl aluminoxane (or represented by methylalumoxane or MAO) or a boron compound is suitably used. If necessary, together with such an alumoxane and a boron compound, an alkylaluminum such as triisobutyl aluminum or triethyl aluminum may be used. Examples of such a co-catalyst, co-catalysts or alkylaluminum compounds disclosed in EP-0872492A2, JP-A-11-130808, JP-A-9-309925, WO00/20426, EP0985689A2 or JP-A-6-184179 may be mentioned. The co-catalyst such as an alumoxane is used in a ratio of from 0.1 to 100,000, preferably from 10 to 10,000, by an aluminum atom/transition metal atom ratio, to the metal of the transition metal compound. If such a ratio is smaller than 0.1, the transition metal compound can not effectively be activated, and if it exceeds 100,000, such tends to be economically disadvantageous.

In a case where a boron compound is used as the co-catalyst, it is used in a boron atom/transition metal atom ratio of from 0.01 to 100, preferably from 0.1 to 10, particularly preferably 1. If such a ratio is smaller than 0.01, the transition metal compound can not be effectively activated, and if it exceeds 100, such will be economically disadvantageous. The transition metal compound and the co-catalyst may be mixed and prepared outside the polymerization installation or may be mixed in the installation at the time of the polymerization.

The olefin to be used in the present invention may, for example, be ethylene, a $C_{3-20}$ α-olefin, such as propylene, 1-butene, 1-hexene, 4-methyl-1-pentene, 1-octene, vinylcyclohexane or a cyclic olefin such as cyclopentene or norbornene. Preferably, ethylene or a mixture of ethylene with an α-olefin such as propylene, 1-butene, 1-hexene or 1-octene, may be employed. Further preferably, ethylene is used.

The aromatic vinyl compound to be used in the present invention may, for example, be styrene or various substituted styrenes such as p-methylstyrene, m-methylstyrene, o-methylstyrene, o-t-butylstyrene, m-t-butylstyrene, p-t-butylstyrene, p-chlorostyrene and o-chlorostyrene. Industrially preferred is styrene, p-methylstyrene or p-chlorostyrene, particularly styrene.

The aromatic polyene to be used in the present invention is a coordination polymerizable aromatic polyene having from 10 to 30 carbon atoms and having plural double bonds (vinyl groups) and a single or plural aromatic groups, and it is an aromatic polyene wherein in a state where one of the double bonds (vinyl groups) is used for the coordination polymerization and polymerized, a double bond remained, is anionic polymerizable. Preferred is any one or a mixture of at least two selected from orthodivinylbenzene, paradivinylbenzene and metadivinylbenzene.

In the production of the olefin/aromatic vinyl compound/aromatic polyene copolymer in the coordination polymerization step in the present invention, the above exemplified respective monomers, the transition metal compound and the co-catalyst are contacted. With respect to the contacting order or contacting method, an optional known method may be employed.

The above-mentioned copolymerization method may, for example, be a method for polymerization in a liquid monomer without using a solvent, or a method of using a single solvent of a saturated aliphatic or aromatic hydrocarbon, or halogenated hydrocarbon, such as pentane, hexane, heptane, cyclohexane, benzene, toluene, ethylbenzene, xylene, chlorobenzene, chlorotoluene, methylene chloride or chloroform, or a mixed solvent. Preferably, a mixed alkane solvent, cyclohexane, toluene or ethylbenzene may be used. The polymerization type may be either solution polymerization or slurry polymerization. Further, a known method such as batch polymerization, continuous polymerization, preliminary polymerization or multistage polymerization may be employed, as the case requires.

A single or connected plural tank-type polymerizer or a linear or loop single or connected plural pipe polymerizer may be employed. In the case of a pipe polymerizer, a known mixing machine such as a dynamic or static mixing machine or a static mixing machine having a heat removal function, or a known cooler such as a cooler provided with a heat removal slender tube may be provided. Further, a batch type preliminary polymerizer may be provided. Further, a method such as gas-phase polymerization may also be employed.

The polymerization temperature is usually from −78° C. to 200° C. A polymerization temperature lower than −78° C., is industrially disadvantageous, and if the temperature exceeds 200° C., decomposition of the transition metal compound takes place, such being undesirable. Industrially more preferably, the polymerization temperature is from 0° C. to 160° C., particularly preferably from 30° C. to 160° C.

The pressure for the polymerization is usually from 0.1 atm to 100 atm, preferably from 1 to 30 atm, particularly industrially preferably, from 1 to 10 atm.

The olefin/aromatic vinyl compound/aromatic polyene copolymer obtainable in the coordination polymerization step in the process of the present invention has a composition having an aromatic vinyl compound unit content of from 15 mol % to 40 mol %, an aromatic polyene unit content of from 0.01 mol % to 3 mol % and the rest being an olefin unit content. When the copolymer has this composition, it becomes possible to present to the cross copolymer softness not heretofore attained.

Further, the most preferably employed transition metal compound for the single-site coordination polymerization catalyst has a structure of the formula (1) wherein each of A and B which may be the same or different, is a group selected from an unsubstituted or substituted cyclopentaphenanthryl group, an unsubstituted or substituted benzoindenyl group, and an unsubstituted or substituted indenyl group, and Y is a methylene group or a boron group, which has bonds to A and B and which further has, as a substituent, hydrogen or a $C_{1-15}$ hydrocarbon group (which may contain from 1 to 3 nitrogen, oxygen, sulfur, phosphorus or silicon atoms), and this transition metal compound is a racemic modification. In a case where this condition is satisfied, the obtainable olefin/aromatic vinyl compound/aromatic polyene copolymer within this compositional range, has an isotactic stereoregularity in its olefin/aromatic vinyl compound alternating structure, preferably in its ethylene/aromatic vinyl compound alternating structure, and thus, the cross copolymer of the present invention may have microcrystallinity derived from this alternating structure. Further, as compared with a case where no stereoregularity is present, this olefin/aromatic vinyl compound/aromatic polyene copolymer is capable of providing good mechanical properties or oil resistance based on the microcrystallinity of the alternating structure, and this characteristic can be inherited to the final cross copolymer of the present invention.

The crystalline melting point due to the microcrystallinity of the alternating structure of the olefin/aromatic vinyl compound/aromatic polyene copolymer is generally within a range of from 50° C. to 120° C., and its crystalline melting heat by DSC is usually at most 40 J/g, preferably at most 30 J/g. The cross copolymer of the present invention may have, as a whole, a crystalline melting heat of at most 40 J/g, preferably at most 30 J/g. The crystallinity for the crystalline melting heat within this range presents no adverse effect to the softness or forming processability of the cross copolymer and is rather useful from the viewpoint of the mechanical properties or oil resistance.

In the process of the present invention, the mass ratio of the olefin/aromatic vinyl compound/aromatic polyene copolymer obtainable in the coordination polymerization step satisfies a condition of from 40 mass % to 90 mass %, preferably from 50 mass % to 90 mass %, most preferably from 55 mass % to 90 mass %, based on the mass of the cross copolymer finally obtainable via the anionic polymerization step. When this condition is satisfied, the softness of the olefin/aromatic vinyl compound/aromatic polyene copolymer will be reflected to the cross copolymer irrespective of the type of the polymer polymerized in the anionic polymerization step, whereby the cross copolymer will show a softness represented by a type A hardness of from 50 to 85, preferably a type A hardness of from 50 to 80. If the mass of the olefin/aromatic vinyl compound/aromatic polyene copolymer obtainable in the coordination polymerization step is less than 40 mass %, based on the mass of the cross copolymer, for example, in a case where the polymer polymerized in the anionic polymerization step is a rigid polymer such as polystyrene, the type A hardness of the obtainable cross copolymer will be higher than the range of the present invention, whereby the softness will be lost. On the other hand, if the mass of the olefin/aromatic vinyl compound/aromatic polyene copolymer obtainable in the coordination polymerization step exceeds 90 mass %, based on the mass of the cross copolymer, the characteristics of the polymer chain polymerized in the anionic polymerization step can not adequately be provided. As the characteristics of the polymer chain polymerized in the anionic polymerization step, for example, in a case where the polymer polymerized in the anionic polymerization step is polystyrene, the heat resistance or the compatibility with the polystyrene polymer may be mentioned.

Anionic Polymerization Step

In the anionic polymerization step in the process of the present invention, polymerization is carried out in the coexistence of the olefin/aromatic vinyl compound/aromatic polyene copolymer obtained in the coordination polymerization step and an anionic polymerizable vinyl compound monomer by using an anionic polymerization initiator.

In such an anionic polymerization step, any anionic polymerizable vinyl compound monomer may be used.

Particularly, as the anionic polymerizable vinyl compound monomer in the present invention, an aromatic vinyl compound such as styrene, p-methylstyrene, p-tert-butylstyrene, p-chlorostyrene, α-methylstyrene, vinylnaphthalene or vinylanthracene, a diene compound such as butadiene or isoprene, an acrylate such as methyl acrylate, or a methacrylate such as methyl methacrylate, or a mixture thereof may be used. Preferably, an aromatic vinyl compound, or a mixture of an aromatic vinyl compound with such an anionic polymerizable monomer is used, and most preferably, an aromatic vinyl compound is used.

In the anionic polymerization step of the present invention, in addition to the above-mentioned anionic polymerizable monomer, an aromatic polyene remaining in a small amount in the polymerization solution as not polymerized in the coordination polymerization step, may be polymerized.

The anionic polymerization step of the present invention is carried out after the above-described coordination polymerization step. At that time, the copolymer obtained in the coordination polymerization step may be separated and purified from the polymerization solution by an optional polymer recovery method such as a crumb forming method, a steam stripping method or a direct solvent-removal method by using an evaporation tank or an evaporation extruder, and then, may be used for the anionic polymerization step. However, it is economically preferred to use the polymerization solution after the coordination polymerization, after releasing or without releasing the residual olefin, to the next anionic polymerization step. It is one of the characteristics of the present invention that the polymerization solution containing the polymer can be used for the crossing step without separating the polymer from the polymerization solution.

The solvent for the anionic polymerization step is particularly preferably a solvent such as a mixed alkane solvent, cyclohexane or benzene, which is free from a trouble such as a chain transfer during the anionic polymerization. However, when the polymerization temperature is not higher than 150° C., other solvents such as toluene and ethylbenzene may be used.

As the polymerization mode, an optional known method useful for anionic polymerization may be used. The polymerization temperature is usually from −78° C. to 200° C. A polymerization temperature lower than −78° C. is industrially disadvantageous, and if it exceeds 150° C., the chain transfer or the like tends to take place, such being undesirable. Industrially more preferably, the polymerization temperature is from 0° C. to 200° C., particularly preferably from 30° C. to 150° C.

The pressure for the polymerization is usually from 0.1 atm to 100 atm, preferably from 1 to 30 atm, industrially particularly preferably from 1 to 10 atm.

In the anionic polymerization step of the present invention, a known anionic polymerization initiator may be used. Preferably, an alkyllithium compound or a lithium salt or sodium salt of biphenyl, naphthalene or pyrene, particularly preferably sec-butyllithium or n-butyllithium may be employed. Further, a polyfunctional initiator, a dilithium compound or a trilithium compound may be used. Further, a known anionic polymerization terminal-coupling agent may be used as the case requires. With respect to the amount of the initiator, in a case where methyl alumoxane is used as a co-catalyst for the polymerization catalyst in the coordination polymerization step, it is preferred to use an amount of at least equivalent, particularly preferably at least 2 equivalents, of the oxygen atoms contained therein. In a case where a boron compound is used as a co-catalyst for the polymerization catalyst in the coordination polymerization step, its amount is sufficiently small as compared with the oxygen atom equivalent in the methyl alumoxane, whereby the amount of the initiator may be reduced.

In the anionic polymerization step, the length of cross chain, or the molecular weight of the homopolymer not crossed may optionally be changed by optionally adjusting the amount of the initiator. The length (molecular weight) of the cross chain portion can be calculated from the molecular weight of the homopolymer not crossed. Such a length is preferably from 5,000 to 150,000, more preferably from 5,000 to 100,000, particularly preferably from 5,000 to 50,000, as a weight average molecular weight. Further, its molecular weight distribution (Mw/Mn) is preferably at most 3, particularly preferably at most 1.5.

Further, the present invention is a process for producing a cross copolymer, wherein the anionic polymerizable vinyl compound monomer to be used in the anionic polymerization step is preferably an aromatic vinyl compound monomer. Here, the aromatic vinyl compound monomer to be used in the coordination polymerization step is preferably the same as the aromatic vinyl compound monomer to be used in the anionic polymerization step. Most preferably, the aromatic vinyl compound monomer to be used in the coordination polymerization step is styrene, and the anionic polymerizable vinyl compound monomer to be used in the anionic polymerization step is styrene, and a part or all thereof is unreacted styrene in the coordination polymerization step.

Further, as another aspect of the present invention, it is a process for producing a cross copolymer wherein it is preferred to employ an olefin/aromatic vinyl compound/aromatic polyene copolymer obtainable in the coordination polymerization step, which has a weight average molecular weight of from 150,000 to 30,000. By such a process, it is possible to obtain a cross copolymer excellent in transparency, and it is possible to obtain a transparent copolymer, of which a sheet having a thickness of 1 mm has a haze of at most 25%, preferably at most 20%, or of which a sheet having a thickness of 1 mm has a total light transmittance of at least 75%, preferably at least 80%. In such a process for producing a transparent cross copolymer, the aromatic vinyl compound monomer to be used in the coordination polymerization step and the aromatic vinyl compound monomer to be used in the anionic polymerization step are preferably the same. Most preferably, the aromatic vinyl compound to be used in the coordination polymerization step is styrene, and the anionic polymerizable vinyl compound monomer to be used in the anionic polymerization step is styrene and a part or all thereof is unreacted styrene in the coordination polymerization step.

With the cross copolymer of the present invention, its hardness can easily be changed by changing the styrene (aromatic vinyl compound) unit content in the main chain or by changing the mass proportion of the olefin/aromatic vinyl compound/aromatic polyene copolymer obtainable in the coordination polymerization step, based on the mass of the cross copolymer finally obtainable via the anionic polymerization step. The heat resistance (heat deformation resistance) can be maintained to be at a level of about 100° C. (in a case where the anionic polymerizable vinyl compound monomer is styrene). This is considered attributable to Tg (glass transition temperature) of the polystyrene block chain polymerized in the anionic polymerization step.

As compared with conventional ethylene/styrene copolymers or other soft resins, the cross copolymer of the present invention has a tensile characteristic closer to soft polyvinyl chloride. Here, the tensile characteristic close to soft polyvinyl chloride means that the relation between stretch and stress is close to a proportional relation, and the S—S curve is diagonally right up (increase of stress to stretch is large). This characteristic may be represented by the ratio of the stress at the time of 100% stretch (100% modulus) to the initial tensile modulus i.e. the Rm value (=100% modulus/initial tensile modulus).

In the case of a usual soft polyvinyl chloride, the Rm value is within a range of from about 0.15 to 0.5. The Rm value of the cross copolymer of the present invention may take a value within substantially the same range as a soft polyvinyl chloride, and thus it has the tensile characteristic i.e. the texture similar to a soft polyvinyl chloride. Whereas, particularly in the case of a conventional olefin type soft resin or the like, the S—S curve will have its gradient reduced after an initial rising in many cases (the increase of stress to stretch is small), and the Rm value will also be generally at is most 0.12, thus showing a different tensile characteristic or texture.

The cross copolymer of the present invention by itself exhibits excellent oil resistance at a temperature of from room temperature to about 70° C. Such oil resistance can be evaluated by the change in weight (swelling ratio) or the change in mechanical properties after immersing it in engine oil representing a mineral oil or in olive oil representing a plant oil. Whereas, a conventional olefin type or styrene type soft resin (thermoplastic resin) has low oil resistance and may have a serious problem depending upon its application, as it undergoes swelling, or cracking, or its physical properties tend to deteriorate. Polyvinyl chloride has oil resistance which a vinyl chloride resin inherently has, but in the case of soft polyvinyl chloride, a plasticizer will elute and thus has a drawback that it tends to be hardened.

The cross copolymer of the present invention exhibits excellent scratch/abrasion resistance. Such scratch/abrasion resistance can be evaluated by a Taber's abrasion resistance test or a scratch test.

The cross copolymer of the present invention exhibits excellent forming processability. The forming processability may be represented by a ratio in the MFR value (e.g. JIS K7210) measured by changing the load. For example, the ratio in the MFR value under a load of 2 kg and 10 kg (ratio in MFR under a load of 10 kg and 2 kg: $I_{10}/I_2$) is in many cases within a range of from 6 to 9 in the case of usual polyolefin or polystyrene. Whereas, the cross copolymer of the present invention may exhibit a value of from about 10 to about 70. This is considered to be attributable to the branch structure (cross structure) of the cross copolymer. If this value is low, in the case of extrusion, when the stress is released immediately after extruded from the die, the resin tends to undergo draw down, such being undesirable. The cross copolymer of the present invention preferably shows a value of at least 0.01 g/10 min and at most 50 g/10 min, as the MFR value measured under the conditions of 200° C. and a load of 2 kg. If the MFR value is lower or higher than this, a special care may be required for its forming.

The cross copolymer of the present invention may be sulfonated by a known method such as a method disclosed in JP-A-2004-504928, JP-A-2004-535270, JP-A-2001-520295 or JP-A-2004-505120. The sulfonated cross copolymer may be used suitably for a moisture permeable membrane or an ionic conductive membrane.

Resin Composition

The cross copolymer of the present invention can be used as a composition together with the following aromatic vinyl compound type polymer or propylene type polymer. In such a case, the cross copolymer may be used within a range of from 1 to 99 mass % based on the total mass of the composition. The cross copolymer of the present invention shows good compatibility with the aromatic vinyl compound type polymer or propylene type polymer. Accordingly, when the cross copolymer is used within a range of from 1 to 50 mass % based on the total mass of the composition, it is effective for softening or improvement of the impact resistance of the aromatic vinyl compound type polymer (such as polystyrene) or polypropylene, and when it is used within a range of from 50 to 99 mass % based on the total mass of the composition, such is effective for adjustment of the physical properties (such as the elastic modulus) or improvement of the heat resistance of the cross copolymer.

Further, the cross copolymer of the present invention may be used as a compatibilizing agent for the aromatic vinyl compound type polymer and the propylene type polymer. In such a case, the compositional ratio of the aromatic vinyl compound type polymer to the propylene type polymer is optional, and the cross copolymer may be used within a range of from 1 to 70 mass % based on the total mass of the composition.

Further, the cross copolymer of the present invention may be used as a composition together with a block copolymer type polymer, and may be used in a range of from 1 to 99 mass % based on the total mass of the composition. The cross copolymer of the present invention has excellent softness and oil resistance an in the composition together with the block copolymer type polymer, it is capable of imparting oil resistance without impairing the softness and mechanical properties.

Aromatic Vinyl Compound Type Polymer

A homopolymer of an aromatic vinyl compound, or statistical copolymer comprising an aromatic vinyl compound and at least monomer component copolymerizable therewith, wherein the aromatic vinyl compound unit content is at least 10 mass %, preferably at most 30 mass %. As aromatic vinyl compound monomers to be used for the aromatic vinyl compound type polymer, styrene and various substituted styrenes such as p-methylstyrene, m-methylstyrene, o-methylstyrene, o-t-butylstyrene, m-t-butylstyrene, p-t-butylstyrene and α-methylstyrene, may be mentioned.

Further, a statistical copolymer made of a plurality of such aromatic vinyl compounds may also be used. Here, the stereoregularity among mutual aromatic groups of such aromatic vinyl compounds may be any of actactic, isotactic or syndiotactic.

The monomer copolymerizable with the aromatic vinyl compound may, for example, be butadiene, isoprene or other conjugated dienes; acrylic acid, methacrylic acid and amide derivatives or ester derivatives thereof; acrylonitrile, maleic anhydride and their derivatives. The copolymerization type is statistical copolymerization. Such an aromatic vinyl compound type polymer is required to have a weight average molecular weight as calculated as polystyrene of at least 30,000, preferably from 50,000 to 500,000, more preferably at most 300,000, in order to have physical properties and forming processability as a practical resin. Further, a rubber component may be blended or grafted in order to impart impact resistance. The aromatic vinyl compound type polymer to be used may, for example, be isotactic polystyrene (i-PS), syndiotactic polystyrene (s-PS), atactic polystyrene (a-PS), rubber-reinforced polystyrene (HIPS), an acrylonitrile/butadiene/styrene copolymer (ABS resin), a styrene/acrylonitrile copolymer (AS resin), a styrene/methacrylate copolymer such as a styrene/methylmethacrylate copolymer, a styrene/diene copolymer (SBR) or its hydrogenated product, a styrene/maleic acid copolymer, and a styrene/imidated maleic acid copolymer.

Propylene Type Polymer

A propylene homopolymer or a copolymer containing at least 30 mass %, preferably at least 50 mass % of a propylene monomer unit. It may, for example, be isotactic polypropylene (i-PP including homo PP, random PP and block PP), syndiotactic polypropylene (s-PP), atactic polypropylene (a-PP), a propylene/ethylene block copolymer, a propylene/ethylene random copolymer or a propylene/butene copolymer. It may be a copolymer having a diene such as butadiene or α-ω diene copolymerized, as the case requires. Such an example may, for example, be an ethylene/propylene/diene copolymer (EPDM) or an ethylene/propylene/ethylidene norbornene copolymer. The propylene type polymer is required to have a weight average molecular weight as calculated as polystyrene of at least 10,000, preferably from 30,000 to 500,000, more preferably at most 300,000, in order to have the physical properties and forming processability as a practical resin.

Block Copolymer Type Polymer

It is a block copolymer having a diblock, triblock, multi-block, star block or tapered block structure obtainable by living polymerization such as anionic polymerization or other polymerization method. As an example, a styrene/butadiene block copolymer (SBS), a styrene/isoprene copolymer (SIS) or their hydrogenated products (SEBS or SIPS) may be mentioned. The block copolymer type polymer is required to have a weight average molecular weight as calculated as polystyrene of at least 5,000, preferably from 10,000 to 300,000, more preferably at most 200,000, in order to have the physical properties and forming processability as a practical resin.

The cross copolymer of the present invention may also be used as a composition together with the following "other resins, elastomers, rubbers".

Other Resins, Elastomers, Rubbers

For example, a petroleum resin or its hydrogenated product, an olefin resin such as high density polyethylene (HDPE), low density polyethylene (LDPE), linear low density polyethylene (LLDPE) or an ethylene/cyclic olefin copolymer, excluding the above-mentioned propylene type polymer; a polyamide such as nylon; a polyimide; a polyester such as polyethylene terephthalate; a polyvinyl alcohol, natural rubber, a silicone resin, and silicone rubber, may be mentioned.

Plasticizer

To the cross copolymer of the present invention, it is possible to incorporate a known optional plasticizer which is commonly used for polyvinyl chloride or other resins. A preferably employed plasticizer is an oxygen-containing or nitrogen-containing plasticizer, and it is a plasticizer selected from an ester type plasticizer, an epoxy type plasticizer, an ether type plasticizer and an amide type plasticizer.

Such a plasticizer has relatively good compatibility with the olefin/aromatic vinyl compound/aromatic polyene copolymer to be used for the cross copolymer of the present invention, so that it tends to hardly bleed out, and further has a good plasticizing effect which can be evaluated by the degree of decrease in the glass transition temperature, and thus can be suitably employed. Further, when such a plasticizer is employed, as a specific effect, it is effective to promote crystallization of the isotactic alternating structure of ethylene and aromatic vinyl compound units in the olefin/aromatic vinyl compound/aromatic polyene copolymer, particularly in the ethylene/aromatic vinyl compound/divinylbenzene copolymer, to be used for the cross copolymer of the present invention, thereby to increase the crystallinity, whereby it is capable of providing an effect to improve heat resistance or oil resistance, in addition to a usual plasticizing effect.

On the other hand, for example, a mineral oil of an aromatic, aliphatic or alicyclic type may sometimes be not suitable, since it has low compatibility with the ethylene/aromatic vinyl compound/aromatic polyene copolymer in the composition, so that it tends to bleed out, or the plasticizing effect which can be evaluated by the degree of decrease in the glass transition temperature, is also low.

Examples of the ester-type plasticizer which may be used suitably in the present invention, include a phthalic acid ester, a trimellitic acid ester, an adipic acid ester, a sebacic acid ester, an azelate-type ester, a citric acid ester, an acetyl citric acid ester, a glutamic acid ester, a succinic acid ester, a mono fatty acid ester such as an acetic acid ester, a phosphoric acid ester and polyesters thereof.

Examples of the epoxy-type plasticizer which may be used suitably in the present invention, include epoxidized soybean oil and epoxidized linseed oil.

Examples of the ether-type plasticizer which may be used suitably in the present invention, include polyethylene glycol, polypropylene glycol, and a copolymer or mixture thereof.

As an example of the amide-type plasticizer which may be used suitably in the present invention, sulfonic acid amide may be mentioned.

These plasticizers may be used alone, or a plurality of them may be used in combination.

In the present invention, an ester type plasticizer is particularly preferably employed. Such a plasticizer has merits such that it is excellent in compatibility with the ethylene/aromatic vinyl compound/aromatic polyene copolymer within the compositional range of the present invention, that it is excellent in the plasticizing effect (the degree of decrease of the glass transition temperature is high), and that bleeding is little. Further, it is effective to promote crystallization of the excellent alternating structure of ethylene and aromatic vinyl compound units thereby to provide a high melting point, such being desirable. Further, most preferably employed in the present invention is a plasticizer of an adipic acid ester or an acetyl citric acid ester. When such a plasticizer is employed, there is a merit such that the crystallization rate is remarkably fast, and crystals will grow in a short period of time from the melt molding, whereby various physical properties will be stabilized.

With respect to the blend amount of the plasticizer, the plasticizer is from 1 to 30 parts by mass, preferably from 1 to 20 parts by mass, based on 100 parts by mass of the cross copolymer of the present invention or its resin composition. If it is less than 1 part by mass, the above effects tend to be inadequate, and if it exceeds 30 parts by mass, such may cause bleeding, or excessive softening or excessive stickiness to be thereby caused.

Inorganic Fillers

Now, inorganic fillers which may be used in the present invention, will be described. An inorganic filler is used also to impart flame retardancy to the cross copolymer of the present invention. The volume average particle diameter of such an inorganic filler is, for example, within a range of at most 20 µm, preferably at most 10 µm. If the volume average particle diameter is less than 0.5 µm or more than 20 µm, the mechanical properties (tensile strength, elongation at break, etc.) tend to deteriorate, and a decrease in flexibility or formation of pin holes is likely to result, when the blend is formed into a film. The volume average particle diameter is a volume average particle diameter measured by a laser diffraction method.

The inorganic fillers may, for example, be aluminum hydroxide, magnesium hydroxide, zirconium hydroxide, calcium hydroxide, potassium hydroxide, barium hydroxide, triphenyl phosphate, ammonium polyphosphate, polyphosphoric acid amide, zirconium oxide, magnesium oxide, zinc oxide, titanium oxide, molybdenum oxide, guanidine phosphate, hydrotalcite, smectite, zinc borate, anhydrous zinc borate, zinc metaborate, barium metaborate, antimony oxide, antimony trioxide, antimony pentoxide, red phosphorus, talc, alumina, silica, boehmite, bentonite, sodium silicate, calcium silicate, calcium sulfate, calcium carbonate and magnesium carbonate, and one or more compounds selected from these may be employed. It is particularly preferred to employ at least one member selected from the group consisting of aluminum hydroxide, magnesium hydroxide, hydrotalcite and magnesium carbonate, since the effect to impart the flame retardancy is thereby excellent, and such is economically advantageous.

The blend amount of the inorganic filler is within a range of from 1 to 300 parts by mass, preferably from 5 to 200 parts by mass, per 100 parts by mass of the cross copolymer of the present invention or its resin composition. If the inorganic filler is less than 1 part by mass, the flame retardancy may sometimes be poor. On the other hand, if the inorganic filler exceeds 300 parts by mass, there may be a case where the mechanical properties such as the moldability, strength, etc., of the resin composition tend to be poor.

In a case where an inorganic filler is incorporated as a non-halogen type flame retardant, it is possible also to form char (carbonized layer) thereby to improve the flame retardancy of e.g. a film.

A method for producing the resin composition, plasticizer composition or filler composition of the present invention is not particularly limited, and a known suitable blending method may be employed. For example, melt-mixing may be carried out by means of e.g. a single screw or twin screw extruder, a Banbury mixer, a plastomill, a cokneader or a heating roll. It is also preferred to preliminarily uniformly mix various materials by a Henschel mixer, a ribbon blender, a super mixer or a tumbler, prior to carrying out the melt mixing. The temperature for the melt mixing is not particularly limited, but it is usually from 100 to 300° C., preferably from 150 to 250° C.

As forming methods to obtain formed products of the cross copolymer of the present invention or its various compositions, known forming methods may be employed such as vacuum molding, injection molding, blow forming, inflation molding, extrusion, contour extrusion, roll-forming, calendering, etc., whereby various sheets, films, bags, tubes, containers, foamed materials, foamed sheets, wire-covering materials may, for example, be formed.

Further, the resins and resin compositions disclosed in the present invention basically contain no halogen and thus have a basic characteristic such that they have high environmental adaptability or safety.

Films, Sheets

In a case where the cross copolymer of the present invention or its resin composition is to be used in the form of a film, the film thickness is not particularly limited, but it is usually from 3 μm to 1 mm, preferably from 10 μm to 0.5 mm. In order to produce a film or sheet made of the resin composition of the present invention, it is possible to employ a forming method such as inflation molding, T-die forming, calendering or roll forming. For the purpose of improving the physical properties, the film of the present invention may be laminated with another suitable film, for example, a film of an isotactic or syndiotactic propylene, a high density polyethylene, a low density polyethylene (LDPE or LLDPE), a polystyrene, a polyethylene terephthalate or an ethylene/vinyl acetate copolymer (EVA). Further, the film of the present invention can be made to have self-tackiness or adhesiveness by properly selecting the composition. However, in a case where a still higher self-tackiness is required, it may be laminated with another film having self-tackiness to form a multilayered film.

The film made of the cross copolymer of the present invention has a tensile characteristic close to a soft polyvinyl chloride, which may be represented by the above-mentioned Rm value. Accordingly, it is useful for a leather (synthetic leather), for which a conventional soft polyvinyl chloride has been used. In such a case, the softness, oil resistance or scratch/abrasion resistance of the cross copolymer of the present invention are substantial merits.

Specific applications of the film of the present invention are not particularly limited, but it is useful for common packaging materials or containers and can be used for a packaging film, a stretch film, a shrink film, various masking films, a protective film, a bag or a pouch.

Tape Base Material

Further, a film made of the cross copolymer of the present invention or a resin composition containing the cross copolymer as the main component, may be used as various tape base materials. Here, the resin composition containing the cross copolymer as the main component means that the cross copolymer is contained in an amount of at least 50 mass % based on the mass (mainly resin mass) of the tape base material excluding the above "inorganic filler". Other resins which may be incorporated to the resin composition are optional, but preferred are the above-mentioned "aromatic vinyl compound type polymer", "propylene type polymer" and/or "block copolymer type polymer". These resins may be suitably incorporated in order to adjust the elasticity or modulus of the tape base material or to impart the heat resistance.

The above "inorganic filler" is added suitably in order to impart flame retardancy to the tape base material, and its amount is optional within a known range, but is usually from 1 to 70 mass %, based on the total weight of the tape base material.

In a case where the cross copolymer of the present invention is used as a tape base material, the softness, oil resistance and characteristic tensile property of the cross copolymer will be meritorious. To form an adhesive tape by using the composition containing the cross copolymer of the present invention, as the tape base material, a known adhesive agent, additives and known forming method may be employed. Such adhesive agent, additives and forming method are, for example, disclosed in JP-A-2000-111646. The adhesive tape made of the tape base material of the present invention may be used suitably as various binding tapes, sealing tapes, protective tapes, fixing tapes, various tapes for electronic materials such as a dicing tape, a back grind tape or a masking tape. Further, it is useful also for various labels.

The film of the present invention may be subjected to surface treatment such as corona, ozone or plasma treatment, application of an anti-fogging agent, application of a lubricant or printing, as the case requires. The film of the present invention may be prepared as a stretched film subjected to monoaxial or biaxial stretch orientation as the case requires. The film of the present invention may be bonded to each other or to another material of e.g. thermoplastic resin by a method such as fusion by means of heat, ultrasonic waves or high frequency or bonding by means of a solvent, as the case requires.

Further, in a case where the film of the present invention has a thickness of e.g. at least 100 μm, it may be formed as a packaging tray for e.g. food products or electric products by a method such as heat forming by e.g. vacuum forming, compression molding or press forming.

To the tape base material, known colorants, anti-oxidants, ultraviolet absorbers, lubricants, stabilizers, and other additives, may be incorporated, as the case requires, within a range not to impair the effects of the present invention.

In the present invention, the tape base material is usually obtained by dry-blending the ethylene/aromatic vinyl compound/aromatic polyene copolymer, the aromatic vinyl compound type resin and the olefin type resin, and the inorganic filler (and materials such as a filler which may be incorporated as the case requires), then kneading such a mixture by means of a Banbury mixer, a roll mill or an extruder, and forming such a kneaded product into a film by a known forming method such as compression molding, calendering, injection molding or extrusion.

The thickness of the tape base material varies depending upon the application of the adhesive tape and is not particularly limited, and for example, it is from 40 to 500 μm, preferably from 70 to 200 μm, more preferably from 80 to 160 μm. Further, the tape base material may be in the form of a single layer or in the form of a plurality of layers.

The tape base material may be irradiated with an electron beam and crosslinked, whereby it is possible to prevent deformation or shrinkage of the tape base material when it is placed in a high temperature environment and thereby to reduce its temperature dependency. The dose of the electron beam at that time is preferably within a range of from 10 to 150 Mrad, preferably within a range of from 15 to 25 Mrad. If the dose is less than 10 Mrad, the temperature dependency will not be reduced. On the other hand, if the dose exceeds 150 Mrad, the tape base material tends to be deteriorated by the electron beam, thus leading to a problem in the processability in the subsequent processing. In order to accelerate the crosslinking by the electron beam, a crosslinking agent may be incorporated. As a specific crosslinking agent, a low molecular weight compound or oligomer having at least two carbon-carbon double bonds in its molecule is preferred. For example, an acrylate type compound, an urethane acrylate type oligomer or an epoxy acrylate type oligomer may be mentioned.

The adhesive tape of the present invention is constituted by providing an adhesive layer on at least one side of the above-mentioned tape base material. As such an adhesive, any adhesive which is presently available may be used such as a rubber type, hot melt type, acrylic type or emulsion type adhesive. Further, in order to provide a desired performance to such an adhesive, an adhesive-imparting agent, an anti-aging agent or a curing agent may, for example, be incorporated.

The base polymer for the rubber type adhesive is preferably natural rubber, regenerated rubber, silicone rubber, isoprene rubber, styrene butadiene rubber, polyisoprene, NBR, a styrene/isoprene copolymer, a styrene/isoprene/butadiene copolymer or the like. To the rubber type adhesive, a crosslinking agent, a softening agent, a filler or a flame retardant may, for example, be added, as the case requires. As a specific example, the crosslinking agent may be an isocyanate type crosslinking agent, the softening agent may be liquid rubber, the filler may be calcium carbonate, and the flame retardant may be an inorganic flame retardant such as magnesium hydroxide or red phosphorus.

The acrylic type adhesive may, for example, be a homopolymer of a (meth)acrylate or a copolymer thereof with a copolymerizable monomer. The (meth)acrylate or copolymerizable monomer may, for example, be a (meth)acrylic acid acryl ester (such as a methyl ester, an ethyl ester, a butyl ester, a 2-ethylhexyl ester or an octyl ester), a (meth)acrylic acid glycidyl ester, (meth)acrylic acid, icatonic acid, maleic anhydride, a (meth)acrylic acid amide, a (meth)acrylic acid N-hydroxyamide, a (meth)acrylic acid alkylaminoalkylester (such as dimethylaminoethyl methacrylate or t-butylaminoethyl methacrylate), vinyl acetate, styrene or acrylonitrile. Among them, the main monomer is usually preferably an acrylic acid alkyl ester, its homopolymer will have a glass transition temperature of at most −50° C.

The adhesive-imparting resin agent may be selected in consideration of the softening point, the compatibility with various components, etc. It may, for example, be a terpene resin, a rosin resin, a hydrogenated rosin resin, a coumarone/indene resin, a styrene type resin, an aliphatic or alicyclic petroleum resin, or its hydrogenated product, a terpene/phenol resin, a xylene type resin, other aliphatic hydrocarbon resins or aromatic hydrocarbon resins. The softening point of the adhesive-imparting resin is preferably from 65 to 170° C., and further, more preferred is an alicyclic saturated hydrocarbon resin or petroleum resin having a softening point of from 65 to 130° C., a polyterpene resin having a softening point of from 80 to 130° C., or a glycerin ester of hydrogenated rosin having a softening point of from 80 to 130° C. They may be used alone or in combination.

The anti-aging agent is used to prevent the rubber type adhesive from deterioration in the presence of oxygen or light as the rubber type adhesive has an unsaturated double bond in the rubber molecule. Such an anti-aging agent may, for example, be a single material or a mixture of e.g. a phenol type anti-aging agent, an amine type anti-aging agent, an benzoimidazole type anti-aging agent, a dithiocarbamic acid salt type anti-aging agent and a phosphorus type anti-aging agent.

The curing agent for an acrylic type adhesive may, for example, be a curing agent of isocyanate type, epoxy type or amine type. Such curing agents may be used alone or in combination as a mixture. The isocyanate type curing agent may specifically be a polyvalent isocyanate compound such as 2,4-tolylene diisocyanate, 2,6-tolylene diisocyanate, 1,3-xylene diisocyanate, 1,4-xylene diisocyanate, diphenylmethane-4,4'-diisocyanate, diphenylmethane-2,4'-diisocyanate, 3-methyldiphenylmethane diisocyanate, hexamethylene diisocyanate, isophorone diisocyanate, dicyclohexylmethane-4,4'-diisocyanate, dicyclohexylmethane-2,4'-diisocyanate or lysine isocyanate.

A coating means to apply the adhesive agent, adhesive-imparting agent and anti-aging agent constituting the adhesive layer of the adhesive tape to a tape base material, is not particularly limited. For example, a method may be mentioned wherein an adhesive solution comprising an adhesive agent, an adhesive-imparting agent and an anti-aging agent is applied on one side of the tape base material by a transfer method, followed by drying.

The thickness of the adhesive layer (the thickness after drying) may suitably be selected within a range not to impair the adhesiveness or handling efficiency, but the thickness of the adhesive layer is usually from 5 to 100 μm, preferably from 10 to 50 μm, although it varies depending upon the application of the adhesive tape. If the thickness is lower than this range, the adhesive strength and unwinding force may sometimes decrease. On the other hand, if it is thicker than this range, the coating performance is likely to be poor.

A tape base material for an adhesive tape, binding tape or sealing tape preferably satisfies the following conditions. When formed into a tape by the above-described method, the cross copolymer of the present invention can satisfy the following conditions and can be used suitably as a tape base material for an adhesive tape, binding tape or sealing tape.

The conditions for the tape base material are as follows:

(1) "The surface state" is clean and smooth.

(2) The initial elastic modulus (MPa) in the MD direction at room temperature is at least 50 MPa and less than 700 MPa.

(3) The elongation at tensile breaking point in the MD direction is at least 100% and less than 500%.

(4) The strength at breaking point (MPa) in the MD direction is at least 10 MPa and less than 70 MPa.

(5) The 10% modulus (the tensile stress at 10% elongation) in the MD direction is at least 2 MPa and less than 15 MPa.

(6) The modulus ratio (100% modulus/10% modulus) in the MD direction is at least 1.6 and less than 5.

(7) "Heat shrinkage" i.e. the shrinkage in the MD direction after leaving a tape base material of 100 mm×100 mm in an atmosphere of 110° C. for 10 minutes, followed by leaving it in an evaluation test chamber set at a temperature of 23±2° C. under a humidity of 50±5% RH for 20 minutes, is less than 10%.

(8) The "manual cutting efficiency" is good, i.e. when the tape is manually cut, it is cleanly cut, although the cut edge slightly stretches.

(9) The "blocking property" i.e. the tape base material is cut into a shape of 50 mm×100 mm, and two such sheets are overlaid at a portion of 50 mm×50 mm and left under a load of 15 kg at 50° C. for 24 hours, whereupon the tape base material can be easily peeled even when adhered or press-bonded.

Here, the MD direction means the longitudinal direction of the tape.

Dynamic Vulcanization Product

The cross copolymer of the present invention may be made together with another polymer into a thermoplastic elastomer composition by dynamic vulcanization treatment. Specifically, it is a thermoplastic elastomer which comprises from 50 mass % to 95 mass %, preferably from 60 mass % to 95 mass %, of the cross copolymer of the present invention and from 5 mass % to 50 mass %, preferably from 5 mass % to 40 mass %, of another polymer and which is obtainable by dynamic vulcanization treatment. Here, another polymer is the above-mentioned "aromatic vinyl compound type polymer", "propylene type polymer", "block copolymer type polymer" or "other resins, elastomers or rubbers".

More preferably, it is a thermoplastic elastomer composition which comprises from 50 mass % to 95 mass % of the cross copolymer of the present invention and from 5 mass % to 50 mass % of a crystalline propylene type polymer and which is obtainable by dynamic vulcanization treatment. Here, the crystalline propylene type polymer is a polymer having an isotactic or syndiotactic stereoregularity and a crystalline melting point of from 100° C. to 170° C., preferably from 120° C. to 170° C., among the above-mentioned propylene type polymers. Such crystalline propylene type polymers may be used alone or in combination.

The thermoplastic elastomer composition of the present invention can be obtained by subjecting a blend comprising (A) the cross copolymer of the present invention and (B) another polymer (such as crystalline propylene type polymer) to dynamic vulcanization treatment (dynamic thermal treatment) in the presence of an organic peroxide or a phenol resin crosslinking agent. Such dynamic vulcanization treatment is a technique wherein various blend materials are forcibly kneaded in a molten state under such a condition that the crosslinking agent will react, thereby to let dispersion and crosslinking take place simultaneously, and it is described in detail in a literature by A. Y. Coran et al. (Rub. Chem. And Technol. Vol. 53, 141 (1980)) and widely known. The dynamic vulcanization is carried out by means of a Banbury mixer, a closed type mixer such as a pressure type kneader, or a single or twin screw extruder. The kneading temperature is usually from 130 to 300° C., preferably from 150 to 250° C. The kneading time is usually from 1 to 30 minutes.

Specifically, the organic peroxide to be used in the dynamic vulcanization treatment may, for example, be dicumyl peroxide, 2,5-dimethyl-2,5-di(tert-butylperoxy)-hexane, 2,5-dimethyl-2,5-di(tert-butylperoxy)-hexyne-3, di-tert-butylperoxide. In the present invention, the organic peroxide is used in a proportion of preferably from 0.1 to 5 parts by mass, more preferably from 0.5 to 3 parts by mass, per 100 parts by mass of (A) the cross copolymer of the present invention. Further, at the time of dynamic vulcanization treatment by the organic peroxide, a peroxide-crosslinking assistant such as a maleimide compound, or a polyfunctional vinyl monomer such as divinylbenzene or trimethylolpropane trimethacrylate may be incorporated.

Further, at the time of the dynamic vulcanization treatment, it is possible to add the above-mentioned "plasticizer" or "inorganic filler" in addition to the above polymer component. The "plasticizer" is used in a proportion of from 1 to 20 parts by mass per 100 parts by mass of the polymer component, and the "inorganic filler" is used preferably in a proportion of from 1 to 200 parts by mass per 100 parts by mass of the polymer component.

The thermoplastic elastomer composition thus obtained may simultaneously have the characteristics of high heat resistance of the crystalline polypropylene type polymer and the softness, oil resistance, mechanical properties, etc. of the cross copolymer of the present invention. Particularly, the softness of the cross copolymer of the present invention contributes to the development of such characteristics. Further, it is considered that the cross copolymer of the present invention having substantially no polyethylene crystallinity contributes to the improvement in the compatibility with the crystalline propylene polymer.

Composition with Petroleum Resin/Hydrogenated Petroleum Resin

A petroleum resin and/or a hydrogenated petroleum resin may be added to the cross copolymer of the present invention to prepare a resin composition. The blend composition is as defined above. However, it is preferably such that the cross copolymer of the present invention is from 70 mass % to 99 mass %, and the petroleum resin and/or the hydrogenated petroleum resin is from 1 mass % to 30 mass %, particularly preferably such that the cross copolymer of the present invention is from 80 mass % to 99 mass %, and the hydrogenated petroleum resin is from 1 mass % to 20 mass %.

Within the above blend ranges, it is possible to widely control the forming processability (as defined by the MFR value) without impairing the mechanical properties inherent to the cross copolymer and to adjust MFR to a level suitable for the particular forming method. The larger the amount of the petroleum resin and/or the hydrogenated petroleum resin having the molecular weight sufficiently lower than the cross copolymer, the larger the MFR of the resin composition becomes. Adjustment of MFR can easily be carried out by a person skilled in the art by adjusting the amount to be incorporated within the above ranges.

Further, by incorporating the petroleum resin and/or the hydrogenated petroleum resin in such a range, the transparency of the cross copolymer may remarkably be improved. In consideration of the coloration and transparency of the resin composition, a hydrogenated petroleum resin with high colorless transparency is preferred for the purpose of the present invention. In a case where the petroleum resin and/or the hydrogenated petroleum resin is less than such a range, the above effects tend to be inadequate, and if it exceeds the above range, the resin composition tends to have adhesiveness derived from the petroleum resin and/or the hydrogenated petroleum resin, such being undesirable depending upon its application. In an application where the adhesiveness is required, for example, in an application to e.g. an adhesive or a heat sealing film, it is of course possible to incorporate it in an amount larger than the above range.

Composition with Block Copolymer

The cross copolymer of the present invention is excellent particularly in its softness, and accordingly, is when it is made into a composition with the above-mentioned block copolymer, particularly the hydrogenated block copolymer, it becomes possible to impart oil resistance, scratch/abrasion resistance and mechanical properties similar to polyvinyl chloride while maintaining its softness and mechanical properties. To such a composition, a crystalline polyolefin (such as an isotactic or syndiotactic polypropylene) may further be incorporated in order to impart heat resistance.

Foam

Further, the cross copolymer of the present invention is useful as a foam (foamed material). A known method may be used for the production of such a foam. The method for producing the foam is not particularly limited, but a known technique may, for example, be mentioned such as a method of adding a blowing agent such as an inorganic or organic chemical blowing agent or a physical blowing agent. Usually, the cross copolymer of the present invention and the blowing agent, and if necessary, a crosslinking agent or other additives, are heat-melted and heat-compressed under extrusion, followed by reducing the pressure for foaming to obtain a foam. Addition of the blowing agent and an optional radical crosslinking agent may be dry blending before heating the polymer or may be after the heat-melting. Such heat-blending can be carried out by a known method by means of e.g. an extruder, a mixer or a blender. Crosslinking may is be carried out not only by the above-mentioned method of adding a crosslinking agent but also by a method of using radiation (electron beam, gamma ray, etc.) Known techniques relating to foamed products are disclosed, for example, in "Plastic Foam Handbook (published in 1973 by Nikkan Kogyo Shinbunsha)".

Further, the method disclosed in WO00/37517 or JP-A-2001-514275 may preferably be adopted for the preparation of the foam. The cross copolymer of the present invention has a characteristic such that the crystallinity is at a level not higher than a certain value, and accordingly, it is possible to easily obtain a foam excellent in softness and texture. For the production of a foam of the present invention, a composition comprising the above "aromatic vinyl compound type polymer", "propylene type polymer", "block copolymer type polymer" and the cross copolymer of the present invention, may be used.

To the foam of the present invention, a dispersant, a softening agent, an adhesion-preventing agent, a filler, a pigment, etc., may be added, as the case requires.

The method for producing the foam of the present invention is not particularly limited and may, for example, be a physical foaming method by injection of a gas, a foaming method by means of water or a chemical foaming method by means of a chemical blowing agent. Further, it is also possible that a blowing agent is incorporated to beads, followed by foaming.

A method for forming the obtained foam into a sheet, film, etc. may, for example, be extrusion, injection molding, blow forming and is not particularly limited, and a sheet, film or the like may be formed into a container, etc. by heat forming, compression molding or the like. Further, it is also possible to carry out embossing, printing or the like. The cross copolymer of the present invention has a characteristic that it has excellent printability.

The foam of the present invention is useful as a building material such as a floor material, a wall material or a wall paper, an interior or exterior article for an automobile, an electrical component, a gasket, a buffer material or a container for e.g. food.

The composition, crosslinked product or foam containing the cross copolymer of the present invention is useful for films, sheets, tubes, containers, etc. Particularly, it is useful as a building material, a wall material, a wall paper or a floor material. Such a building material, wall material, wall paper or floor material is disclosed, for example, in WO96/04419, EP0661345 or WO98/10160. In such applications, it is possible to incorporate a filler in a high content while maintaining the high mechanical strength and the mechanical and physical properties such as elongation, which is significant particularly in that the flame retardancy can thereby be imparted in such applications.

Wire Coating Material

The cross copolymer and resin composition of the present invention are useful as coating materials for various electrical wires or cables. Especially, the composition with a filler and/or a known flame retardant is excellent in softness, mechanical properties, abrasion resistance and oil resistance and is suitably for such applications. Further, in order to improve the heat resistance, it is also possible to apply various known crosslinking methods, such as chemical crosslinking by means of a crosslinking agent or a crosslinking method by means of e.g. an electron beam.

EXAMPLES

Now, the present invention will be described in further detail with reference to Examples, but it should be understood that the present invention is by no means restricted to the following Examples.

The analyses of the copolymers obtained in Examples were carried out by the following methods.

The 13C-NMR spectrum was measured by means of α-500 manufactured by JEOL Ltd., and by using a deuterated chloroform solvent or a deuterated 1,1,2,2-tetrachloroethane solvent and TMS (tetramethylsilane) as the standard. Here, the measurement using TMS as the standard is the following measurement. Firstly, using TMS as the standard, the shift value of the center peak among the triplet 13C-NMR peaks of deuterated 1,1,2,2-tetrachloroethane was determined. Then, a copolymer was dissolved in deuterated 1,1,2,2-tetrachloroethane, and 13C-NMR was measured, whereupon each peak shift value was calculated by using the triplet center peak of deuterated 1,1,2,2-tetrachloroethane as the standard. The shift value of the triplet center peak of deuterated 1,1,2,2-tetrachloroethane was 73.89 ppm. The measurement was carried out by dissolving the polymer in such a solvent in an amount of 3 mass/vol %.

The 13C-NMR spectrum measurement for quantitative determination of the peak area was carried out by a proton gate decoupling method having NOE erased by using pulses with a pulse width of 45° and a repeating time of 5 seconds as the standard.

Determination of the styrene unit content in the copolymer was carried out by 1H-NMR, and as the instrument, α-500 manufactured by JEOL Ltd., and AC-250 manufactured by BRUCKER were used. A copolymer was dissolved in deuterated 1,1,2,2-tetrachloroethane, and the measurement was carried out at a temperature of from 80 to 100° C. The determination was carried out by the area intensity comparison of the peak (6.5 to 7.5 ppm) attributable to the phenyl group proton and the proton peak (0.8 to 3 ppm) attributable to the alkyl group, using TMS as the standard.

The molecular weight was obtained by means of GPC (gel permeation chromatography) as a weight average molecular weight calculated as a standard polystyrene. The measurement was carried out by using HLC-8020 manufactured by Tosoh Corporation using THF as the solvent.

The DSC measurement was carried out by using DSC200 manufactured by Seiko Instruments Inc. in a nitrogen stream. Namely, by using 10 mg of a resin composition, the DSC measurement was carried out from −50° C. to 240° C. at a temperature raising rate of 10° C./min, whereby the melting point, the crystalline melting heat and the glass transition point were obtained. A second measurement which is usually carried out after quenching with liquid nitrogen after the first measurement, was not carried out.

Here, as a sample for evaluation of the physical properties, a sheet having a thickness of 1.0 mm formed by a hot press method (temperature: 180° C., time: three minutes, pressure: 50 kg/cm$^2$), was used.

Tensile Test

In accordance with JIS K-6251, a sheet is cut into No. 2 and No. 1/2 type test pieces and measured at a tensile speed of 500 mm/min by means of AGS-100D model tensile tester manufactured by Shimadzu Corporation.

Hardness

With respect to the hardness, type A durometer hardness was obtained in accordance with JIS K-7215 test method for durometer hardness of plastics. This hardness is an instantaneous value.

Total Light Transmittance, Haze

For the transparency, a sheet having a thickness of 1 mm was formed by a hot press method (temperature: 200° C., time: 4 minutes, pressure: 50 kg/cm$^2$G), and the total light transmittance and haze were measured by means of a turbidity meter NDH2000 manufactured by NIPPON DENSHOKU INDUSTRIES CO., LTD. in accordance with JIS K-7105 test method for optical characteristics of plastics.

Oil Resistance Test 1

In accordance with JIS K-7114, an oil resistance test was carried out. A circular test piece having a thickness of 3 mm was immersed in a test oil (engine oil, olive oil hexane) at 23° C., and the weight change after 14 days was measured.

Weight change(%)=100×(weight after the immersion test−weight before the immersion test)/weight before the immersion test The weight change being 0% means that there was no weight change. In consideration of deformation of a formed product by swelling with oil, the weight change is preferably less than ±10%.

Oil Resistance Test 2

JIS No. 2 small type 1/2 dumbbell was immersed in the same manner in a test oil (engine oil, olive oil) at 23° C., and it was taken out after 14 days and subjected to a tensile test to measure the breaking strength, and the breaking strength retention was obtained by the following formula.

Breaking strength retention(%)=100×breaking strength after the immersion test/the breaking strength before the immersion test The retention being 100% means that the breaking strength did not change at all.

This breaking strength retention is generally preferably at least 70% and at most 150%.

Heat Deformation Resistance Test

JIS No. 2 small type 1/2 dumbbell was hunged in a prescribed oven and heat-treated at a prescribed temperature for one hour, whereby the lengths in the longitudinal and width directions of the dumbbell were measured before and after the treatment, and the elongation/shrinkage changes were obtained by the following formulae. The maximum temperature at which the elongation/shrinkage changes in the longitudinal or width direction were all within 5%, was taken as the heat deformation resistance temperature.

Elongation change=100×(length after the test−length before the test)/length before the test Shrinkage change=100×(length before the test−length after the test)/length before the test Scratch Resistance Test By a scratch tester, scratching was carried out under a load of 1 N, and then, evaluation was carried out by means of a surface roughness measuring apparatus to obtain the following Ra value.

Ra (arithmetic mean roughness): total value of absolute values of deviation Yi (μm) from the average line to the measured curve $$Ra = 1/N \Sigma |Yi|$$

Divinylbenzene

Metadivinylbenzene used in the following Examples 1, 3 to 6 and 9 to 12 is metadivinylbenzene (isomer purity: at least 97%) manufactured by ASAHI KASEI FINECHEM CO., LTD. Here, the isomer purity is the proportion of metadivinylbenzene to various divinylbenzene isomers of ortho, meta and para. The paradivinylbenzene used in Example 7 is paradivinylbenzene (isomer purity: at least 95%) manufactured by ASAHI KASEI FINECHEM CO., LTD.

Divinylbenzene used in Examples 2 and 8 is one manufactured by Aldrich (purity as divinylbenzene: 80%, the mass ratio of meta:para in the meta and para mixture was 70:30).

Gel Content

The gel content of the cross copolymer was measured in accordance with ASTM D-2765-84. Namely, accurately measured 1.0 g of a polymer (a foamed product having a diameter of about 1 mm and a length of about 3 mm) was packed in a 100 mesh stainless steel net bag and accurately weighed. This was extracted in boiling xylene for about 5 hours, whereupon the net bag was recovered and dried under vacuum at 90° C. for at least 10 hours. It was sufficiently cooled, and then, the net bag was accurately weighed, and the polymer gel amount was calculated by the following formula.

Gel amount=mass of polymer remaining in the net bag/mass of initial polymer×100

Catalyst (Transition Metal Compound)

In the following Examples 1 to 11, as a catalyst (a transition metal compound), rac (racemate)-dimethylmethylenebis(4,5-benzo-1-indenyl)zirconium dichloride (formula 7) was used.

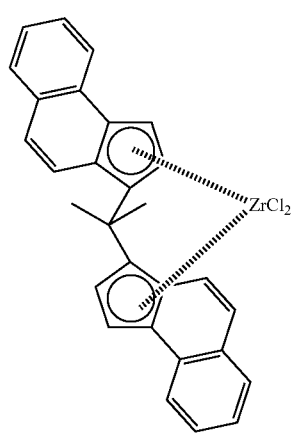

Formula 7

In Example 12, as a catalyst (a transition metal compound), rac-dimethylmethylene(4,5-benzo-1-indenyl)(1-indenyl)zirconium dichloride (Formula 8) was used.

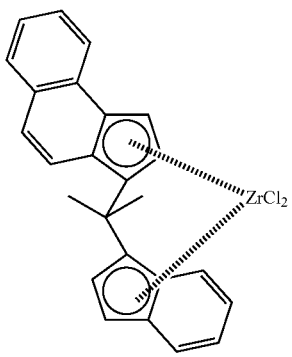

Formula 8

Example 1

Preparation of Cross Copolymer

As a catalyst, rac-dimethylmethylenebis(4,5-benzo-1-indenyl)zirconium dichloride was used, and the preparation was carried out as follows.

Polymerization was carried out by using an autoclave having a capacity of 10 L and equipped with a stirrer and a heating/cooling jacket.

4,200 mL of cyclohexane, 600 mL of styrene and methadivinylbenzene manufactured by ASAHI KASEI FINECHEM CO., LTD. (7 mmol as methadivinylbenzene) were charged and stirred under heating at an internal temperature of 70° C. Dried nitrogen gas was bubbled in an amount of about 200 L to purge moisture in the system and the polymerization solution. Then, 8.4 mmol of triisobutyl aluminum and methyl alumoxane (PMAO-3A manufactured by Tosoh Akzo Corporation) in an amount of 12.6 mmol based on Al (disclosed as MAO in the Table) were added. Immediately, ethylene was introduced, and after stabilizing the pressure at 0.3 MPa (2.0 kg/cm²G), about 50 mL of a toluene solution having 21 μmol of rac-dimethylmethylenebis(4,5-benzo-1-indenyl)zirconium dichloride and 0.84 mmol of triisobutyl aluminum dissolved, was added to the autoclave from a catalyst tank installed on the autoclave. While maintaining the internal temperature at 70° C. and the pressure under 0.3 MPa, polymerization was carried out for 1.4 hours (coordination polymerization step). The consumption of ethylene at this stage was about 150 L in a standard state. A small amount (a few tens mL) of the polymerization solution was sampled and mixed to methanol to precipitate the polymer thereby to obtain a polymer sample in the coordination polymerization step. From this sample solution, the yield, composition, molecular weight, etc. of the polymer in the coordination polymerization step were obtained.

Supply of ethylene to the polymerizer was stopped, and ethylene was quickly released. Then, 27.3 mmol of sec-butyllithium was introduced from a catalyst tank into the polymerizer as accompanied with nitrogen gas. Anionic polymerization was immediately initiated, and the internal temperature rose from 70° C. to 80° C. While maintaining the temperature at a level of from 70 to 80° C. for 30 minutes, stirring was continued to continue the polymerization (anionic polymerization step). After completion of the polymerization, the obtained polymer solution was gradually introduced into a large amount of a methanol solution with vigorous stirring to recover the polymer. This polymer was dried in air at room temperature for one day, whereupon it was dried at 80° C. under vacuum until a mass change was no longer observed. 771 g of the polymer (cross copolymer) was obtained.

Example 2

Using toluene as the solvent, polymerization was carried out in the same manner as in Example 1 under the conditions as identified in Table 1.

Example 3

Using cyclohexane as the solvent, and adjusting the polymerization temperature in the coordination polymerization step to be 80° C., the polymerization was carried out in the same manner as in Example 1 under the conditions as identified in Table 1.

Examples 4 to 11

Using cyclohexane as the solvent, and adjusting the polymerization temperature in the coordination polymerization step to be 90° C., the polymerization was carried out in the same manner as in Example 1 under the conditions as identified in Table 1.

Example 12

Using rac-dimethylmethylenebis(4,5-benzo-1-indenyl)zirconium dichloride as a transition metal compound (catalyst) the polymerization was carried out under the conditions as identified in Table 1.

Comparative Example 1

The polymerization was carried out under substantially the same condition as in Example 4 except that no divinylbenzene was used.

Comparative Example 2

The polymerization was carried out by changing the ethylene partial pressure as shown in Table 1 to prepare a cross copolymer having a composition which is outside the composition for the cross copolymer of the present invention i.e. the composition of an ethylene/styrene/divinylbenzene copolymer obtained in the coordination polymerization step has a styrene unit content of 8 mol %.

The polymerization conditions are shown in Table 1.

TABLE 1

| | Coordination polymerization step | | | | | | | | Anionic polymerization step | |
|---|---|---|---|---|---|---|---|---|---|---|
| | Catalyst μmol | MAO mmol | Styrene ml | Solvent 1) ml | Temperature °C. | Ethylene MPa | DVB mmol | Consumption of ethylene L | Yield g | BuLi mmol | Yield g |
| Ex. 1 | 21 | 12.6 | 600 | CyH; 4200 | 70 | 0.3 | 7 (m) | 148 | 591 | 27.3 | 771 |
| Ex. 2 | 21 | 8.4 | 600 | Tol; 4200 | 70 | 0.35 | 8 (m + p) | 242 | 590 | 18.9 | 834 |
| Ex. 3 | 21 | 12.6 | 600 | CyH; 4200 | 80 | 0.34 | 14 (m) | 159 | 597 | 27.3 | 778 |
| Ex. 4 | 21 | 12.6 | 600 | CyH; 4200 | 90 | 0.34 | 14 (m) | 159 | 635 | 27.3 | 803 |
| Ex. 5 | 21 | 12.6 | 600 | CyH; 4200 | 90 | 0.3 | 21 (m) | 115 | 455 | 27.3 | 744 |
| Ex. 6 | 21 | 12.6 | 600 | CyH; 4200 | 90 | 0.34 | 14 (m) | 120 | 431 | 27.3 | 742 |
| Ex. 7 | 21 | 12.6 | 600 | CyH; 4200 | 90 | 0.34 | 14 (p) | 118 | 448 | 27.3 | 718 |
| Ex. 8 | 21 | 12.6 | 600 | CyH; 4200 | 90 | 0.34 | 15 (m + p) | 125 | 478 | 27.3 | 746 |
| Ex. 9 | 21 | 12.6 | 400 | CyH; 4400 | 90 | 0.5 | 14 (m) | 234 | 542 | 27.3 | 680 |
| Ex. 10 | 21 | 12.6 | 600 | CyH; 4200 | 90 | 0.44 | 14 (m) | 166 | 545 | 28.3 | 780 |
| Ex. 11 | 21 | 12.6 | 600 | CyH; 4200 | 90 | 0.34 | 14 (m) | 91 | 443 | 28.3 | 715 |
| Ex. 12 | 21 | 12.6 | 600 | CyH; 4200 | 90 | 0.44 | 14 (m) | 218 | 647 | 27.3 | 837 |
| Comp. Ex. 1 | 21 | 12.6 | 600 | CyH; 4200 | 90 | 0.34 | 0 | 140 | 534 | 27.3 | 763 |
| Comp. Ex. 2 | 21 | 12.6 | 400 | CyH; 4400 | 90 | 0.8 | 14 (m) | 351 | 674 | 26.6 | 860 |

1) CyH: Cyclohexane Tol: Toluene
2) DVB (divinylbenzene)
m: methadivinylbenzene manufactured by ASAHI KASEI FINECHEM CO., LTD.
m + p: divinylbenzene manufactured by Aldrich, meta/para mixed product
p: paradivinylbenzene manufactured by SAHI KASEI FINECHEM CO., LTD.

Further, in Tables 2 and 3, the results of analyses of the polymers obtained in the respective Examples and Comparative Examples are shown.

The analytical values of a polymer obtained in the coordination polymerization step were such that the small amount (a few tens mL) of the polymerization solution sampled upon completion of the coordination polymerization step, was mixed to methanol to precipitate the polymer, which was recovered and analyzed to obtain the yield, composition, molecular weight, etc. of the polymer in the coordination polymerization step. The divinylbenzene unit content of the polymer obtained in the coordination polymerization step was obtained from the difference between the amount of divinylbenzene used for the polymerization and the amount of non-reacted divinylbenzene in the polymerization solution obtained by the gas chromatography analysis.

Further, in the Table, in accordance with U.S. Pat. No. 6,096,849, the TUS/DOU value of the main chain ethylene/styrene/divinylbenzene copolymer obtained in the coordination polymerization step in each Example, was shown. Here, TUS is the total vinyl group content contained in the copolymer and is the sum of the contents of the vinyl group derived from the organic polyene (divinylbenzene) unit and the vinyl group at the polymer terminal, and it was obtained by the 1H-NMR measurement. Further, the DOU value is the divinylbenzene unit content contained in the main chain ethylene/styrene/divinylbenzene copolymer.

In the olefin/aromatic vinyl compound/aromatic polyene copolymer (ethylene/styrene/divinylbenzene copolymer) obtainable in the coordination polymerization step of the present invention, the TUS/DOU value takes a value higher than 1.1, and usually takes a value of from 1.2 to 10, preferably from 1.2 to 3. If the TUS/DOU value is larger, the aromatic polyene unit content tends to be too small, and the function as the cross copolymer of the present invention is likely to be lost. On the other hand, if the TUS/DOU value is not higher than 1.1, the aromatic polyene unit content tends to be too large, and the function derived from the main chain tends to be lost, and forming processability of the cross copolymer is likely to be deteriorated, or a gel is likely to form in the cross copolymer.

TABLE 2

| | Coordination polymerization step | | | | | | | | |
|---|---|---|---|---|---|---|---|---|---|
| | Styrene content mol % | Styrene conversion % | DVB content mol % | Mw $10^4$ | Mn $10^4$ | Mw/Mn | Tm °C. | ΔH J/g | TUS/DOU |
| Ex. 1 | 30 | 66 | 0.05 | 24.7 | 9.0 | 2.7 | —* | —* | 1.32 |
| Ex. 2 | 22 | 55 | 0.05 | 21.0 | 8.2 | 2.6 | —* | —* | 1.40 |
| Ex. 3 | 25 | 60 | 0.08 | 16.7 | 5.9 | 2.8 | —* | —* | 1.33 |
| Ex. 4 | 24 | 62 | 0.07 | 9.4 | 3.9 | 2.4 | —* | —* | 1.62 |
| Ex. 5 | 29 | 51 | 0.12 | 8.8 | 3.8 | 2.3 | —* | —* | 1.30 |
| Ex. 6 | 29 | 48 | 0.10 | 8.8 | 3.8 | 2.3 | —* | —* | 1.41 |
| Ex. 7 | 27 | 48 | 0.07 | 8.8 | 3.9 | 2.2 | —* | —* | 1.64 |
| Ex. 8 | 28 | 52 | 0.07 | 8.9 | 3.9 | 2.3 | —* | —* | 1.58 |
| Ex. 9 | 15 | 55 | 0.06 | 8.2 | 3.4 | 2.4 | 57.0 | 26.0 | 1.82 |

TABLE 2-continued

| | Coordination polymerization step | | | | | | | | |
|---|---|---|---|---|---|---|---|---|---|
| | Styrene content mol % | Styrene conversion % | DVB content mol % | Mw 10⁴ | Mn 10⁴ | Mw/Mn | Tm °C. | ΔH J/g | TUS/DOU |
| Ex. 10 | 22 | 51 | 0.07 | 11.1 | 4.4 | 2.5 | —* | —* | 1.57 |
| Ex. 11 | 29 | 49 | 0.08 | 8.8 | 3.5 | 2.5 | —* | —* | 1.49 |
| Ex. 12 | 18 | 53 | 0.07 | 8.9 | 3.6 | 2.5 | —* | —* | 1.74 |
| Comp. Ex. 1 | 26 | 56 | 0.00 | 8.6 | 3.6 | 2.4 | —* | —* | Not measured |
| Comp. Ex. 2 | 8 | 45 | 0.07 | Not measured | Not measured | Not measured | 91.0 | 60.0 | Not measured |

—*: A melting peak with a crystalline melting heat of at least 10 J/g was not observed.

TABLE 3

| | Anionic polymerization step | | | Proportion of copolymer obtained in coordination polymerization step (mass %) |
|---|---|---|---|---|
| | Total styrene content mol % | Tm °C. | ΔH J/g | |
| Ex. 1 | 39 | —* | —* | 77 |
| Ex. 2 | 34 | —* | —* | 71 |
| Ex. 3 | 37 | —* | —* | 77 |
| Ex. 4 | 37 | —* | —* | 79 |
| Ex. 5 | 47 | —* | —* | 61 |
| Ex. 6 | 47 | —* | —* | 58 |
| Ex. 7 | 44 | —* | —* | 62 |
| Ex. 8 | 44 | —* | —* | 64 |
| Ex. 9 | 21 | 67.0 | 20.0 | 80 |
| Ex. 10 | 36 | —* | —* | 70 |
| Ex. 11 | 47 | —* | —* | 62 |
| Ex. 12 | 30 | —* | —* | 77 |
| Comp. Ex. 1 | 39 | —* | —* | 70 |
| Comp. Ex. 2 | 14 | 86.0 | 42.0 | 78 |

—* A melting peak with a crystalline melting heat of at least 10 J/g was not observed.

In Table 4, the results of measurements of the hardness, transparency, mechanical properties, MFR and gel content of the polymer obtained in each Example or Comparative Example, are shown. In Table 4, as a Comparative Example, the results of a common soft polyvinyl chloride (Comparative Example 3: type A hardness 88 was used, and Comparative Example 4: type A hardness 75 was used), and the result of Comparative Example 5: SEBS (H1053), were also shown.

Further, the results obtained by using a sample (Comparative Example 6) obtained by kneading SEBS (H1053) and iPP (J226E) in a weight ratio of 75:25 at 200° C. for 5 minutes by using a Brabender Plasticoder (PL2000 model, manufactured by Brabender), were also shown.

TABLE 4

| | Hardness | Haze % | Total light transmittance % | Stress at break MPa | Elongation at break % | Initial tensile modulus MPa | 100% modulus MPa |
|---|---|---|---|---|---|---|---|
| Ex. 1 | 66 | 88 | 64 | 17 | 852 | 7.3 | 2.8 |
| Ex. 2 | 80 | 93 | 53 | 28 | 734 | 15.1 | 6.1 |
| Ex. 3 | 65 | 50 | 69 | 14 | 710 | 7.6 | 3.1 |
| Ex. 4 | 64 | 13 | 86 | 11 | 715 | 6.9 | 2.3 |
| Ex. 5 | 80 | 9 | 87 | 13 | 494 | 35.0 | 5.9 |
| Ex. 6 | 79 | 10 | 87 | 10 | 609 | 21.6 | 3.8 |
| Ex. 7 | 69 | 17 | 82 | 15 | 580 | 15.3 | 3.9 |
| Ex. 8 | 67 | 16 | 84 | 10 | 700 | 7.3 | 2.2 |
| Ex. 9 | 80 | 24 | 76 | 24 | 800 | 18.8 | 5.5 |
| Ex. 10 | 73 | 17 | 83 | 16 | 670 | 12.1 | 3.6 |
| Ex. 11 | 81 | 10 | 87 | 12 | 550 | 34.0 | 5.5 |
| Ex. 12 | 75 | 25 | 80 | 18 | 850 | 11.5 | 3.5 |
| Comp. Ex. 1 | 60 | 93 | 58 | 1 | 1780 | 5.9 | 1.5 |
| Comp. Ex. 2 | 92 | 41 | 74 | 23 | 610 | 45.0 | 7.9 |
| Comp. Ex. 3 | 88 | (Colored product: black) | (Colored product: black) | 24 | 380 | 37.0 | 13.0 |

TABLE 4-continued

| | | | | | | |
|---|---|---|---|---|---|---|
| Comp. Ex. 4 | 75 | (Colored product: red) | (Colored product: red) | 26 | 450 | 21.0 | 9.9 |
| Comp. Ex. 5 | 75 | 8 | 91 | 40 | 1500 | 24.0 | 3.0 |
| Comp. Ex. 6 | 87 | 30 | 86 | 40 | 1550 | 52.5 | 5.2 |

| | | MFR | | | |
|---|---|---|---|---|---|
| | Rm value | 200° C. 2.16 kg g/10 min | 200° C. 10 kg g/10 min | 10 kg/2 kg | Gel content wt % |
| Ex. 1 | 0.38 | 0.3 | 5.08 | 17 | 0 |
| Ex. 2 | 0.41 | 0.26 | 5.72 | 22 | 0 |
| Ex. 3 | 0.41 | 0.04 | 1.7 | 43 | 0 |
| Ex. 4 | 0.33 | 5.41 | 76.19 | 14 | 0 |
| Ex. 5 | 0.17 | 0.41 | 10.28 | 25 | 0 |
| Ex. 6 | 0.18 | 18 | Large, Not-measurable | — | 0 |
| Ex. 7 | 0.25 | 17 | Large, Not-measurable | — | 0 |
| Ex. 8 | 0.30 | 15.5 | Large, Not-measurable | — | 0 |
| Ex. 9 | 0.29 | 0.06 | 0.6 | 10 | 0 |
| Ex. 10 | 0.30 | 0.1 | 5.2 | 52 | 0 |
| Ex. 11 | 0.16 | 5.2 | 84 | 16 | 0 |
| Ex. 12 | 0.30 | 0.5 | 15.5 | 31 | 0 |
| Comp. Ex. 1 | 0.25 | Large not-measurable | Large, Not-measurable | — | 0 |
| Comp. Ex. 2 | 0.18 | Small not-measurable | Small, Not-measurable | — | 0 |
| Comp. Ex. 3 | 0.35 | — | — | — | — |
| Comp. Ex. 4 | 0.47 | — | — | — | — |
| Comp. Ex. 5 | 0.12 | — | — | — | — |
| Comp. Ex. 6 | 0.10 | — | — | — | — |

The ethylene/styrene/divinylbenzene copolymer obtained in the coordination polymerization step in each Example had a composition with a styrene unit content of from 15 mol % to 40 mol % and a divinylbenzene unit content of from 0.05 mol % to 0.2 mol %, and the crystalline melting heat by DSC of each of the ethylene/styrene/divinylbenzene copolymer obtained in the coordination polymerization step and the cross copolymer finally obtained via the anionic polymerization step in each Example, showed a value of at most 30 J/g.

The mass proportion of the polymer obtained in the coordination polymerization step in each Example was from 40 mass % to 90 mass % to the mass of the cross copolymer finally obtainable via the anionic polymerization step. Further, the type A hardness of the obtained cross copolymer was from 50 to 85.

In a case where the weight average molecular weight of the polymer obtained in the coordination polymerization step is at most 150,000, the obtainable cross copolymer is transparent, and the haze of its sheet having a thickness of 1 mm is at most 25%, and the total light transmittance shows a value of at least 75%. Further, in a case where the composition of the ethylene/styrene/divinylbenzene copolymer obtained in the coordination polymerization step satisfies a condition of the styrene unit content being from 20 mol % to 40 mol %, the cross copolymer is more transparent, the haze of its sheet having a thickness of 1 mm is at most 20%, and the total light transmittance shows a value of at least 80%.

Figure 2:
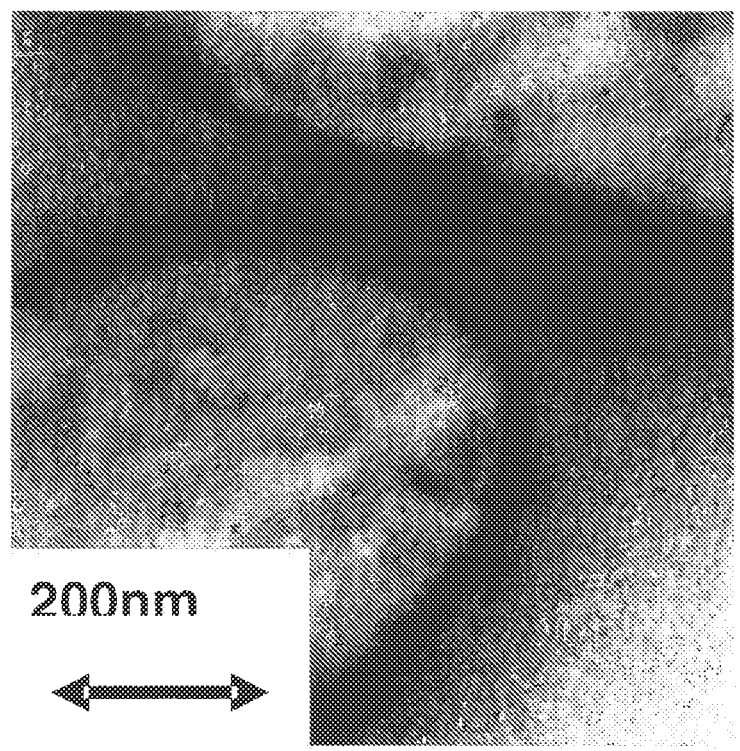
FIG. 2 is a TEM photograph of a polymer obtained in Comparative Example 1 (a film press-formed at 180° C. was used).

Each of all cross copolymers obtained in Examples of the present invention showed an elongation of at least 300% and a strength at break of at least 10 MPa and thus had adequate mechanical properties as a soft resin. On the other hand, the polymer obtained in Comparative Example 1 (using no divinylbenzene) was very poor in the mechanical properties and opaque. TEM photographs of the polymer (cross copolymer) obtained in Example 4 and the polymer obtained in Comparative Example 1 are shown in FIGS. 1 and 2. The cross copolymer has a phase separated structure of relatively uniform nano scale at a level of from 30 to 50 nm, thus indicating the presence of a relatively uniform polymer having block chains constituted by different types of polymers, i.e. a cross copolymer. On the other hand, the polymer of Comparative Example using no divinylbenzene, shows a phase separated structure of a micron scale, and from this structure, it is concluded to be a composition of an ethylene/styrene copolymer and a polystyrene which are mutually not-compatible with each other.

Further, as shown in Comparative Example 2, in a case where the styrene unit content of the ethylene/styrene/divinylbenzene copolymer obtained in the coordination polymerization step is less than 15 mol %, the crystallinity tends to be high and the softness tends to be inadequate. Further, there is a case where the transparency will also be lost.

It is evident that as compared with a conventional ethylene/styrene copolymer or other soft resins, the cross copolymer of the present invention has a tensile characteristic close to soft polyvinyl chloride. Such a characteristic may be represented by the Rm value as the ratio of the stress (MPa) at the time of 100% elongation to the initial tensile modulus (MPa) (stress at the time of 100% elongation/initial tensile modulus).

In the case of a usual soft polyvinyl chloride, the Rm value will be within a range of from about 0.15 to 0.5. It is evident that the Rm value of the cross copolymer obtained in each Example takes a value within substantially the same range as a soft polyvinyl chloride, and thus it is evident that it has the tensile characteristic i.e. texture similar to a soft polyvinyl chloride. Whereas, it is evident that in the case of the hydrogenated styrene/butadiene block copolymer (SEBS) or a composition comprising SEBS and isotactic PP (iPP), the S—S curve becomes different from the soft polyvinyl chloride, the Rm value tends to be usually at most 0.12, and it shows a tensile characteristic different from the soft polyvinyl chloride.

Further, it is evident that the cross copolymer of each Example contains no gel content.

Table 5 shows the oil resistance test results, the heat deformation resistance test results and the scratch resistance test results.

TABLE 5

|  | Oil resistance test 1 Weight change | | Oil resistance test 2 Breaking strength retention | | Heat deformation resistance test | Scratch resistance |
| --- | --- | --- | --- | --- | --- | --- |
|  | Engine oil % | Olive oil % | Engine oil % | Olive oil % | Heat deformation temperature °C. | test Ra µm |
| Ex. 2 | 5.2 | 4.4 | 70 | 80 | 110 | 0.37 |
| Ex. 4 | 3.0 | 7.7 | 100 | 75 | 110 | 0.25 |
| Comp. Ex. 3 | −0.3 | −1.7 | 100 | 100 | 110 | 0.14 |
| Comp. Ex. 4 | −1.2 | −3.0 | 80 | 110 | 110 | 0.10 |
| Comp. Ex. 5 | 124.0 | 16.3 | 0 | 10 | 90 | 0.49 |
| Comp. Ex. 6 | 78.0 | 11.0 | 2 | 22 | 130> | 0.60 |

It is evident that with the cross copolymer of the present invention (Example 2 or 4), even when it is immersed in a mineral oil (engine oil) or a plant oil (olive oil), the weight increase due to swelling is very little, and the change (decrease) in mechanical properties is also little, and thus it shows very good oil resistance. Whereas, it is evident that SEBS (Comparative Example 5) or the SEBS/iPP composition (Comparative Example 6) is poor in oil resistance.

It is evident that the cross copolymer of each Example is excellent also in heat resistance (heat deformation resistance) like a soft polyvinyl chloride. Further, it is evident that also in the scratch resistance, it is superior to SEBS or the SEBS/iPP composition, although its level is not so high as a soft polyvinyl chloride.

Dynamic Vulcanization Product

Dynamic vulcanization treatment was carried out as follows to obtain a thermoplastic elastomer composition.

Using Brabender Plasticoder (PL2000 model, manufactured by Brabender), the cross copolymer obtained in each Example and isotactic polypropylene (random type J226E, manufactured by Mitsui Chemicals, Inc.) were kneaded in the presence of a crosslinking agent (percumyl D) in the proportions (parts by mass) as shown in Table 6 at 200° C. at 60 rpm for 3 minutes to prepare a sample.

Example A

As the cross copolymer, the polymer obtained in Example 3 was used.

Example B

As the cross copolymer, the polymer obtained in Example 4 was used.

Example C

As the cross copolymer, the polymer obtained in Example 4 was used.

Example D

As the cross copolymer, the polymer obtained in Example 6 was used.

Comparative Example 6

The Same Composition as in the above Comparative Example 6 comprising SEBS (H1053) and isotactic PP (J226E). In the same manner, kneading was carried out by the Brabender Plasticoder to obtain the composition. The mass ratio was 75:25.

Comparative Example 7

A composition comprising commercially available EPR and isotactic PP (J226E). In the same manner, kneading was carried out by the Brabender Plasticoder to obtain the composition. The mass ratio was 75:25.

Comparative Example 8

A commercially available propylene/EPDM type partially crosslinked compound. Type A hardness of 80.

Comparative Example 9

A commercially available propylene/SEPS type partially crosslinked compound. Type A hardness of 80.

The results of evaluation of the physical properties are shown in Table 6.

TABLE 6

|  |  | Ex. A | Ex. B | Ex. C | Ex. D |
| --- | --- | --- | --- | --- | --- |
| Blend proportions (parts by weight) | Polymer obtained in Ex. 3 | 75 |  |  |  |
|  | Polymer obtained in Ex. 4 |  | 75 | 90 |  |
|  | Polymer obtained in Ex. 6 |  |  |  | 75 |
|  | SEBS |  |  |  |  |
|  | EPR |  |  |  |  |
|  | Isotactic PP (J226E) | 25 | 25 | 10 | 25 |
|  | Crosslinking agent percumyl D | 0.5 | 0.5 | 0.5 | 0.5 |
| Evaluation results of physical properties | MFR 200° C. load 2.16 kg g/10 min | 1.8 | 18 | 15 | 20 |
|  | Initial tensile modulus (MPa) | 43.9 | 35.4 | 14 | 76.4 |
|  | Elongation at breaking point (%) | 604 | 500 | 500 | 333 |
|  | Strength at breaking point (MPa) | 17.7 | 12.3 | 12.5 | 12.8 |
|  | Heat deformation resistance test / Heat deformation temperature | >130° C. | >130° C. | >120° C. | >130° C. |
|  | Oil resistance test 1 / Weight change Engine oil | 2.9 | 4.7 | 4 | 1.8 |
|  | Oil resistance test 1 / Weight change Olive oil | 4 | 4.8 | 4.3 | 1.9 |
|  | Oil resistance test 2 / Breaking strength retention | 85 | 86 | 95 | 90 |

TABLE 6-continued

|  |  |  | | | |
|---|---|---|---|---|---|
| Oil resistance test 2 | Engine oil Breaking strength retention Olive oil | 80 | 95 | 87 | 88 |

|  |  | Comp. Ex. 6 | Comp. Ex. 7 | Comp. Ex. 8 | Comp. Ex. 9 |
|---|---|---|---|---|---|
| Blend proportions (parts by weight) | Polymer obtained in Ex. 3 | | | | |
| | Polymer obtained in Ex. 4 | | | | |
| | Polymer obtained in Ex. 6 | | | | |
| | SEBS | 75 | | | |
| | EPR | | 75 | | |
| | Isotactic PP (J226E) | 25 | 25 | | |
| | Crosslinking agent percumyl D | | | | |
| Evaluation results of physical properties | MFR 200° C. load 2.16 kg g/10 min | 0.72 | 4.6 | 0.04 (230° C.) | 0.3 (230° C.) |
| | Initial tensile modulus (MPa) | 52.5 | 34.5 | 30.3 | 22 |
| | Elongation at breaking point (%) | 1550 | 1800 | 840 | 1850 |
| | Strength at breaking point (MPa) | 40 | 34.5 | 10 | 19.2 |
| | Heat deformation resistance test / Heat deformation temperature | >130° C. | >130° C. | >130° C. | >130° C. |
| | Oil resistance test 1 / Weight change Engine oil | 78 | 16 | 28 | 34 |
| | Oil resistance test 1 / Weight change Olive oil | 11 | 2 | 2 | 3 |
| | Oil resistance test 2 / Breaking strength retention Engine oil | 2 | 52 | 61 | 60 |
| | Oil resistance test 2 / Breaking strength retention Olive oil | 22 | 90 | 98 | 100 |

It is evident that the thermoplastic elastomers in Examples A, B, C and D show good heat resistance and mechanical properties and excellent oil resistance.

Composition Comprising Cross Copolymer and Hydrogenated Petroleum Resin

A resin composition comprising a cross copolymer and a hydrogenated petroleum resin was obtained as follows.

Using Brabender Plasticoder (PL2000 model, manufactured by Brabender), the cross copolymer obtained in each Example and a hydrogenated petroleum resin アルコン P-100, manufactured by Arakawa Chemical Industries, Ltd.) were kneaded in the blend proportions (parts by mass) as shown in Table 7 at 200° C. at 60 rpm for 3 minutes to prepare a sample.

Example E

As the cross copolymer, the polymer obtained in Example 3 was used.

Example F

As the cross copolymer, the polymer obtained in Example 9 was used.

Example G

As the cross copolymer, the polymer obtained in Example 11 was used.

The evaluation results of physical properties are shown in Table 7.

TABLE 7

|  |  | Ex. E | Ex. F | Ex. G |
|---|---|---|---|---|
| Blend proportions (parts by weight) | Polymer obtained in Ex. 3 | 90 | | |
| | Polymer obtained in Ex. 9 | | 90 | |
| | Polymer obtained in Ex. 11 | | | 95 |
| | Hydrogenated petroleum resin P-100 | 10 | 10 | 5 |
| Evaluation results of physical properties | MFR 200° C. load: 2.16 kg g/10 min | 0.21 | 0.21 | 11 |
| | MFR 200° C. load: 10 kg g/10 min | 6.08 | 10.26 | Not measurable |
| | Transparency haze 1 mm | 27.0 | 14.0 | 6.0 |
| | Strength at breaking point (MPa) | 19.6 | 23.4 | 16.3 |
| | Elongation at breaking point (%) | 763.0 | 934.6 | 520.7 |
| | Initial tensile modulus (MPa) | 7.1 | 11.3 | 46.0 |
| | Stress at 100% elongation (MPa) | 3.0 | 3.8 | 7.0 |

Not measurable: Too much flow to measure.

As compared with MFR of the cross copolymer alone as shown in Table 4, MFR can be increased by incorporating the hydrogenated petroleum resin without substantially changing the mechanical properties. Further, it is evident that as compared with the cross copolymer alone, the transparency of the composition is improved substantially.

Example 13

Preparation of Cross Copolymer

As a catalyst, rac-dimethylmethylenebis(4,5-benzo-1-indenyl)zirconium dichloride was used, and the preparation was carried out as follows.

Polymerization was carried out by using an autoclave having a capacity of 50 L and equipped with a stirrer and a heating/cooling jacket.

26.5 L of cyclohexane, 3.5 L of styrene and divinylbenzene manufactured by Aldrich (a meta and para mixed product, 61 mmol as divinylbenzene) were charged and stirred (220 rpm) by adjusting the internal temperature at 60° C. Dried nitrogen gas was bubbled in the liquid at a flow rate of 30 L/min to purge moisture in the system and the polymerization solution. Then, 50 mmol of triisobutyl aluminum and methyl alumoxane (MMAO-3A/hexane solution manufactured by Tosoh Akzo Corporation) in an amount of 100 mmol based on Al (disclosed as MAO in the Table) were added. Immediately, the interior of the system was purged with ethylene. After sufficient purging, the internal temperature was raised to 75° C., and ethylene was introduced. After the pressure was stabilized at 0.4 MPaG (4.0 kg/cm$^2$G), about 50 mL of a toluene solution having 60 μmol of rac-dimethylmethylenebis(4,5-benzo-1-indenyl)zirconium dichloride and 1 mmol of triisobutyl aluminum dissolved therein, was added to the autoclave from a catalyst tank installed on the autoclave. Further, while maintaining the internal temperature at 75° C. and the pressure at 0.4 MPaG, polymerization was carried out for 100 minutes (coordination polymerization step). The consumption of ethylene at this stage was about 970 L in a standard state. A small amount (a few tens mL) of the polymerization solution was sampled and mixed to methanol to precipitate the polymer thereby to obtain a polymer sample in the coordination polymerization step. From this sample solution, the yield, composition, molecular weight, etc. of the polymer in the coordination polymerization step were obtained.

Supply of ethylene to the polymerizer was stopped, and ethylene was quickly released, and at the same time, the internal temperature was cooled to 60° C. Then, 200 mmol of sec-butyllithium was introduced from a catalyst tank into the polymerizer as accompanied with nitrogen gas. Anionic polymerization was immediately initiated, and the internal temperature rose from 60° C. to 75° C. While maintaining the temperature at a level of from 70 to 80° C. for 30 minutes, stirring was continued to continue the polymerization (anionic polymerization step).

After completion of the polymerization, the obtained polymer solution was gradually added by a gear pump into heated water containing a dispersant (Pluronic) and potassium alum with vigorous stirring, and the solvent was removed to obtain polymer crumbs (size: about 1 cm) dispersed in heated water. Such polymer crumbs were subjected to centrifugal separation to remove water, and dried in air at room temperature for one day and then dried at 60° C. under vacuum until no more change in mass was observed. As a result, about 4.3 kg of a polymer (cross copolymer) was obtained.

Example 14

Polymerization was carried out in the same manner as in Example 13 except that the ethylene pressure was changed to 3.0 MPaG. After about 180 minutes, the ethylene consumption became 950 L, whereupon supply of ethylene was stopped and in the same manner as in Example 13, an anionic polymerization step and recovery of a polymer were carried out.

As a result, about 4.3 kg of a polymer (cross copolymer) was obtained.

Example 15

Using the same apparatus and method as in Example 1, polymerization was carried out under the conditions shown in Table 8.

The polymerization conditions and the analytical results of the polymers are shown in Tables 8 and 9.

TABLE 8

| | Coordination polymerization step | | | | | | | | |
|---|---|---|---|---|---|---|---|---|---|
| | Catalyst μmol | MAO mmol | Styrene ml | Solvent[1] L | Temperature °C. | Ethylene MPa | DVB[2] mmol | Ethylene consumption L | Yield[3] kg |
| Ex. 13 | 60 | 100 | 3.5 | CyH; 26.5 | 75 | 0.4 | 61 | 970 | 2.9 |
| Ex. 14 | 60 | 100 | 3.5 | Tol; 26.5 | 75 | 0.3 | 61 | 900 | 3.3 |
| Ex. 15 | 21 | 12.6 | 0.6 | CyH; 4.2 | 90 | 0.2 | 14.2 | 84 | 0.43 |

| | Anionic polymerization step | | Proportion of copolymer obtained in coordination polymerization step (mass %) |
|---|---|---|---|
| | BuLi mmol | Yield g | |
| Ex. 13 | 200 | 4.3 | 67 |
| Ex. 14 | 200 | 4.3 | 77 |
| Ex. 15 | 26 | 0.67 | 64 |

[1]CyH: Cyclohexane
[2]DVB (divinylbenzene) divinylbenzene manufactured by Aldrich, meta/para mixed product
[3]Yield calculated from the weight of the sampled solution upon completion of the coordination polymerization step and the analytical results

TABLE 9

| | Coordination polymerization step | | | | | | | | |
|---|---|---|---|---|---|---|---|---|---|
| | Styrene content mol % | Styrene conversion % | DVB content mol % | Mw 10^4 | Mw/Mn | Tm °C. | ΔH J/g | Tg /° C. | TUS/DOU |
| Ex. 13 | 22 | 56 | 0.06 | 19.5 | 2.8 | —* | —* | −16.0 | 1.35 |
| Ex. 14 | 27 | 63 | 0.08 | 19.4 | 2.8 | —* | —* | −11.0 | 1.32 |
| Ex. 15 | 29 | 51 | 0.07 | 7.7 | 2.3 | —* | —* | −1.0 | 1.55 |

| | Anionic polymerization step | | | |
|---|---|---|---|---|
| | Total St content /mol % | Total St conversion /% | Tm /° C. | ΔH J/g |
| Ex. 13 | 34 | 100 | —* | —* |
| Ex. 14 | 37 | 100 | —* | —* |
| Ex. 15 | 46 | 100 | —* | —* |

—*: A melting point peak of crystalline melting heat of at least 10 J/g was not observed.

Composition Comprising Cross Copolymer and Hydrogenated Block Copolymer

A resin composition comprising a cross copolymer and a hydrogenated block copolymer was obtained as follows.

Using Brabender Plasticoder (PL2000 model, manufactured by Brabender), the cross copolymer obtained in each Example and SEBS (TUFTEC H1053) were kneaded in the blend proportions (parts by mass) as shown in Table 8 at 200° C. at 60 rpm for 3 minutes to prepare a sample.

Example H

As the cross copolymer, the polymer obtained in Example 14 was used.

Comparative Example 10

Instead of the cross copolymer, the hydrogenated SBR was used. The evaluation results of the physical properties are shown in Table 10.

TABLE 10

| | | Ex. H | Comp. Ex. 10 | SEBS | Hydrogenated SBR |
|---|---|---|---|---|---|
| Blend proportions (parts by mass) | | | | | |
| Polymer obtained in Ex. 14 | | 50 | | | |
| SEBS | | 50 | 50 | 100 | |
| Hydrogenated SBR | | | 50 | | 100 |
| MFR 200° C. 10 kg | g/10 min | 5.6 | 3.9 | 2.3 | 13.2 |
| Hardness | | 78 | 81 | 79 | 67 |
| Elastic modulus | MPa | 26.3 | 27.8 | 24 | 8.3 |
| Elongation at break | % | 1349 | 869 | 1554 | 757 |
| Strength at break | MPa | 33.7 | 13.5 | 38 | 17.2 |
| 100% modulus | MPa | 3.2 | 3.4 | 3 | 3.8 |
| 300% modulus | MPa | 4.9 | 4.7 | 4.9 | 6.7 |
| Oil resistance test 1 (weight change) | | | | | |
| Engine oil | % | 37.9 | 74.7 | 124 | 48.4 |
| Olive oil | % | 8.1 | 23.3 | 16 | 205.5 |

The resin composition comprising the cross copolymer of the present invention and SEBS, maintains the equal levels of elongation and strength at breaking point as the starting material SEBS, and its oil resistance is improved. Whereas, the resin composition comprising SEBS and hydrogenated SBR have both the elongation and strength at breaking point deteriorated as compared with the starting material SEBS, and its oil resistance is also not good.

Film, Tape Base Material

In order to evaluate the cross copolymer of the present invention as a film base material or tape base material, preparation of a film by using a twin roll mill and a calendering machine and evaluation of the physical properties were carried out. Preparation of a film by a twin-roll mill was carried out by using a test mixing roll (NS-155 model) manufactured by Nishimura Machinery Co., Ltd. The roll temperature was suitably adjusted within a range of from 120° C. to 170° C. for every polymer sample. At the time of the twin-roll forming, additives were incorporated in the following proportions to 100 parts by mass of each polymer or resin composition.

| | |
|---|---|
| Phosphoric acid ester H-933D-3 (lubricant): | 0.5 part |
| Zinc stearate LTB-1830 (lubricant): | 0.3 part |
| Erucic acid amide (blocking-preventive agent): | 1.0 part |

Preparation of a film by calendering was carried out by incorporating the following stabilizer, lubricant or colorant to the blend resins of Examples K and L and Comparative Example 15 in Table 11, followed by kneading by a Banbury mixer.

| | |
|---|---|
| Neutral polymer type HALS TINUVIN XT 850FF (weather resistance-assisting agent): | 0.1 part |
| Hindered phenol type antioxidant AO-60: | 0.1 part |
| Phosphoric acid ester H-933D-3 (lubricant): | 0.5 part |
| Zinc stearate LTB-1830 (lubricant): | 0.3 part |
| Erucic acid amide (blocking-preventive agent): | 1.0 part |
| Pigment F-30940MM (black): | 3.0 parts |

Thereafter, a film having a thickness of about 0.1 mm was prepared by calendering (roll temperature: 165° C.). Further, the obtained film was coated with an acrylic adhesive, followed by drying, and then cut into a tape having a width of 25 mm to obtain an adhesive tape.

Under the following standards, evaluation as a tape base material (binding tape, sealing tape) was carried out, and the results are shown in Table 11. Further, as a Comparative Example, the evaluation results of a tape base material obtained in the same manner by using a styrene/ethylene copolymer (the composition and molecular weight are disclosed in the Table) obtained by the method disclosed in JP-A-11-130808, are shown.

Strength at Breaking Point (MPa)
○: One with at least 10 MPa and less than 70 MPa
X: One with less than 10 MPa or at least 70 MPa 10% modulus

TABLE 11

|  |  | Ex. I | Ex. J | Ex. K | Ex. L | Comp. Ex. 12 | Comp. Ex. 13 | Comp. Ex. 14 | Comp. Ex. 15 | PVC |
|---|---|---|---|---|---|---|---|---|---|---|
| Polymer obtained in Ex. 13 | | | 100 | 90 | 95 | | | | | — |
| Polymer obtained in Ex. 15 | | 100 | | | | | | | | — |
| Styrene/ethylene copolymer; St content: 20 mol %, Mw: 200,000 | | | | | | 100 | | | | — |
| Styrene/ethylene copolymer; St content: 25 mol %, Mw: 200,000 | | | | | | | 100 | 70 | | — |
| Styrene/ethylene copolymer; St content: 30 mol %, Mw: 250,000 | | | | | | | | | 70 | — |
| St-MAA | | 0 | 0 | 10 | 0 | 0 | 0 | 15 | 15 | — |
| GPPS | | 0 | 0 | 0 | 5 | 0 | 0 | 15 | 15 | — |
| Filming method | | Twin roll | Twin roll | Calendering | Calendering | Twin roll | Twin roll | Twin roll | Calendering | Calendering |
| Thickness (μm) | | 76.5 | 102.0 | 11.0 | 92.0 | 88.0 | 118.0 | 69.0 | 63.7 | 86.8 |
| Initial modulus (MPa) | MD Direction | 200.5 | 63.8 | 300.8 | 255.8 | 5.0 | 11.0 | 342.0 | 377.6 | 79.4 |
| Judgment | | ○ | ○ | ○ | ○ | X | X | ○ | ○ | ○ |
| Elongation at breaking point (%) | MD Direction | 145.0 | 339.6 | 272.7 | 365.9 | 533.0 | 443.0 | 393.0 | 227.0 | 229.4 |
| Judgment | | ○ | ○ | ○ | ○ | X | ○ | ○ | ○ | ○ |
| Strength at breaking point (MPa) | MD Direction | 19.7 | 27.6 | 27.1 | 31.6 | 8.2 | 26.1 | 31.4 | 17.1 | 24.8 |
| Judgment | | ○ | ○ | ○ | ○ | X | ○ | ○ | ○ | ○ |
| 10% modulus | MD Direction | 10.7 | 3.1 | 8.7 | 6.8 | 0.4 | 0.9 | 8.2 | 9.5 | 3.9 |
| Judgment | | ○ | ○ | ○ | ○ | X | X | ○ | ○ | ○ |
| 100% modulus (MPa) | MD Direction | 19.2 | 10.1 | 17.1 | 13.0 | 1.4 | 3.8 | 11.1 | 13.2 | 15.1 |
| Modulus ratio (100%/10%) | | 1.8 | 3.3 | 2.0 | 1.9 | 3.5 | 4.2 | 1.4 | 1.4 | 3.8 |
| Judgment | | ○ | ○ | ○ | ○ | ○ | ○ | X | X | ○ |
| Surface state | | ○ | ○ | ○ | ○ | ○ | ○ | ○ | ○ | ○ |
| Heat shrinkage | | ○ | ○ | ○ | ○ | X | X | ○ | ○ | ○ |
| Manual cutting efficiency | | ○ | ○ | ○ | ○ | ○ | ○ | ○ | ○ | ○ |
| Blocking property | | ○ | ○ | ○ | ○ | X | X | ○ | ○ | ○ |

In Table 11, "surface state" was such that the surface condition of the obtained tape base material was visually observed and evaluated by the following evaluation standards:
○: one with smooth flat surface
X: irregularities (shark skin) were observed, and the thickness of the tape base material was non-uniform.

In Table 11, the tensile characteristics were measured in accordance with JIS K-6251, and in the MD (tape length) direction, the initial modulus, the elongation at breaking point, the strength at breaking point and the modulus at each elongation were obtained. The test was carried out in an evaluation test chamber set at a temperature of 23±2° C. under a humidity of 50±5% RH, and number of test pieces was n=at least 3, and the average value of the measured values was taken.

Further, judgment was made by the following evaluation standards.
Initial Elastic Modulus (MPa)
○: One with at least 50 MPa and less than 700 MPa
X: One with less than 50 MPa or at least 700 MPa Elongation at breaking point
○: One with elongation at tensile breaking point being at least 100% and less than 500%
X: One with elongation at tensile breaking point being less than 100% or at least 500%

○: One with tensile stress at 10% elongation being at least 2 MPa and less than 15 MPa
X: One with tensile stress at 10% elongation being less than 2 MPa or at least 15 MPa
Modulus Ratio (100% modulus/10% Modulus)
○: One with at least 1.6 and less than 5
X: One with less than 1.6 or at least 5

In Table 11, "heat shrinkage" is a shrinkage in MD (tape length direction) after letting a tape base material of 100 mm×100 mm stand still in an atmosphere of 110° C. for 10 minutes and then letting it stand still in an evaluation test chamber set at a temperature of 23±2° C. under a humidity of 50±5% RH for at least 20 minutes. An average value of the measured values of n=at least 3, was taken, and the evaluation was made by the following standards:
○: One with shrinkage being less than 10%
X: One with shrinkage being at least 10% Hand cutting efficiency
○: One with a cutting edge slightly stretched, but cleanly cut
X: One with a cutting edge stretched and further cut in MD (tape length direction) (longitudinal cutting)

In Table 11, "blocking property" was such that a tape base material was cut in a size of 50 mm×100 mm, and two such sheets were overlaid with a portion of 50 mm×50 mm and left to stand under a load of 15 kg at 50° C. for 24 hours, whereupon the release condition of the tape base material was evaluated by the following evaluation standards.

◯: One wherein the tape base materials are attached or press-bonded but can be peeled.

X: One wherein the tape base materials are attached or press-bonded and cannot be peeled.

From the foregoing, it is evident that the cross copolymer of the present invention or a resin composition containing such a cross copolymer as the main component is useful as a tape base material.

The cross copolymer obtained by the process of the present invention has small crystallinity, is soft and shows excellent mechanical properties similar to a soft polyvinyl chloride and heat resistance and oil resistance. Further, in a case where the specific production conditions of the present invention are satisfied, in addition to the above, it is possible to efficiently synthesize a transparent cross copolymer. The cross copolymer obtained by the process of the present invention basically contains no chlorine and is considered to have high environmental adaptability. Further, the cross copolymer obtained by the process of the present invention basically contains no plasticizer and thus is considered to have a high environmental adaptability.

INDUSTRIAL APPLICABILITY

The cross copolymer obtained by the process of the present invention has small crystallinity, is soft and shows excellent mechanical characteristics similar to a soft polyvinyl chloride and heat resistance and oil resistance, and it basically contains no chlorine or no plasticizer and thus has a high environmental adaptability, and thus is useful for e.g. films, sheets, tubes or containers. Especially, it can be used suitably as building materials, wall materials, wall papers or floor materials.

The entire disclosures of Japanese Patent Application No. 2006-147991 filed on May 29, 2006, Japanese Patent Application No. 2006-288070 filed on Oct. 23, 2006 and Japanese Patent Application No. 2007-125496 filed on May 10, 2007 including specifications, claims, drawings and summaries are incorporated herein by reference in their entireties.

The invention claimed is:

1. A cross copolymer, comprising an olefin/aromatic vinyl compound/aromatic polyene copolymer cross polymerized with an anionically polymerizable vinyl compound monomer,
wherein
the cross copolymer contains 40 mass % to 90 mass %, based on the mass of the cross copolymer, of the olefin/aromatic vinyl compound/aromatic polyene copolymer,
the olefin/aromatic vinyl compound/aromatic polyene copolymer has an aromatic vinyl compound unit content of from 15 mol % to 40 mol %, an aromatic polyene unit content of from 0.01 mol % to 3 mol % and the remainder composed of olefin units,
the olefin/aromatic vinyl compound/aromatic polyene copolymer has a weight average molecular weight of from 30,000 to 150,000,
the cross copolymer is transparent and a sheet of the cross polymer having a thickness of 1 mm has a haze of at most 25% and has a total light transmittance of at least 75%, and
the cross copolymer has a type A hardness of from 50 to 85.

2. The cross copolymer of claim 1, which has a type A hardness of 60 to 85.

3. The cross copolymer of claim 1, which has a type A hardness of 50 to 80.

4. The cross copolymer of claim 1, wherein a sheet of the cross polymer having a thickness of 1 mm has a haze of at most 25% and has a total light transmittance of at least 80%.

5. The cross copolymer of claim 1, wherein a sheet of the cross polymer having a thickness of 1 mm has a haze of at most 25% and has a total light transmittance of at least 81%.

6. The cross copolymer of claim 1, which is obtained by a process comprising:
synthesizing the olefin/aromatic vinyl compound/aromatic polyene copolymer by coordination polymerization; and then
polymerizing the anionically polymerizable vinyl compound monomer in the presence of the olefin/aromatic vinyl compound/aromatic polyene copolymer and an anionic polymerization initiator.

7. The cross copolymer of claim 6, wherein in the coordination polymerization, a single-site coordination polymerization catalyst comprising a transition metal compound of the following formula (1) or (6) and a co-catalyst, is used:

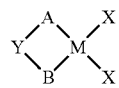

Formula (1)

wherein each of A and B which may be the same or different, is an unsubstituted or substituted cyclopentaphenanthryl group, an unsubstituted or substituted benzoindenyl group, an unsubstituted or substituted cyclopentadienyl group, an unsubstituted or substituted indenyl group, or an unsubstituted or substituted fluorenyl group, where the substituted cyclopentaphenanthryl group, the substituted benzoindenyl group, the substituted cyclopentadienyl group, the substituted indenyl group, or the substituted fluorenyl group, is a cyclopentaphenanthryl group, a benzoindenyl group, a cyclopentadienyl group, an indenyl group, or a fluorenyl group, having at least one substitutable hydrogen atom substituted by a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group);

Y is a methylene group, a silylene group, an ethylene group, a germylene group or a boron group, which has bonds to A and B and which further has, as a substituent, hydrogen or a $C_{1-15}$ hydrocarbon group (this substituent may contain from 1 to 3 nitrogen, oxygen, sulfur, phosphorus or silicon atoms); such substituents may be the same or different from one another; and Y may have a cyclic structure;

X is hydrogen, a hydroxyl group, a halogen, a $C_{1-20}$ hydrocarbon group, a $C_{1-20}$ alkoxy group, a silyl group having a $C_{1-4}$ hydrocarbon group, or an amido group having a $C_{1-20}$ hydrocarbon group; and the two X may have a bond; and M is zirconium, hafnium or titanium;

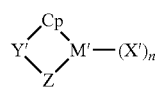

Formula (6)

wherein Cp is an unsubstituted or substituted cyclopentaphenanthryl group, an unsubstituted or substituted benzoindenyl group, an unsubstituted or substituted cyclopentadienyl group, an unsubstituted or substituted indenyl group, or an unsubstituted or substituted fluorenyl group, where the substituted cyclopentaphenanthryl group, the substituted benzoindenyl group, the substituted cyclopentadienyl group, the substituted indenyl group, or the substituted fluorenyl group, is a cyclopentaphenanthryl group, a benzoindenyl group, a cyclopentadienyl group, an indenyl group, or a fluorenyl group, having at least one substitutable hydrogen atom substituted by a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group);

Y' is a methylene group, a silylene group, an ethylene group, a germylene group or a boron group, which has bonds to Cp and Z and which further has, as a substituent, hydrogen or a $C_{1-15}$ hydrocarbon group, such substituents may be the same or different from one another; and Y' may have a cyclic structure;

Z is a group which is a ligand containing nitrogen, oxygen or sulfur and coordinated with M' by the nitrogen, oxygen or sulfur, and which has a bond to Y' and further has hydrogen or a $C_{1-15}$ substituent;

M' is zirconium, hafnium or titanium;

X' is hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group, or a dialkylamido group having a $C_{1-6}$ alkyl substituent; and n is an integer of 1 or 2.

8. The cross copolymer of claim 6, wherein in the coordination polymerization, a single-site coordination polymerization catalyst comprising a transition metal compound of the following formula (1) and a co-catalyst, is used:

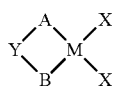

Formula (1)

wherein each of A and B which may be the same or different, is an unsubstituted or substituted cyclopentaphenanthryl group, an unsubstituted or substituted benzoindenyl group, an unsubstituted or substituted cyclopentadienyl group, an unsubstituted or substituted indenyl group, or an unsubstituted or substituted fluorenyl group, where the substituted cyclopentaphenanthryl group, the substituted benzoindenyl group, the substituted cyclopentadienyl group, the substituted indenyl group, or the substituted fluorenyl group, is a cyclopentaphenanthryl group, a benzoindenyl group, a cyclopentadienyl group, an indenyl group, or a fluorenyl group, having at least one substitutable hydrogen atom substituted by a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group);

Y is a methylene group, a silylene group, an ethylene group, a germylene group or a boron group, which has bonds to A and B and which further has, as a substituent, hydrogen or a $C_{1-15}$ hydrocarbon group (this substituent may contain from 1 to 3 nitrogen, oxygen, sulfur, phosphorus or silicon atoms); such substituents may be the same or different from one another; and Y may have a cyclic structure;

X is hydrogen, a hydroxyl group, a halogen, a $C_{1-20}$ hydrocarbon group, a $C_{1-20}$ alkoxy group, a silyl group having a $C_{1-4}$ hydrocarbon group, or an amido group having a $C_{1-20}$ hydrocarbon group; and the two X may have a bond; and M is zirconium, hafnium or titanium.

9. The cross copolymer of claim 8, wherein a single-site coordination polymerization catalyst comprising a transition metal compound of the formula (1) and a co-catalyst, is used, and in the formula (1), each of A and B which may be the same or different, is an unsubstituted or substituted benzoindenyl group of the formula (2), (3) or (4), or an unsubstituted or substituted indenyl group of the formula (5), and Y is a methylene group or a boron group which has bonds to A and B and which further has, as substituent, hydrogen or a $C_{1-15}$ hydrocarbon group (this substituent may further contain from 1 to 3 nitrogen, oxygen, sulfur, phosphorus or silicon atoms):

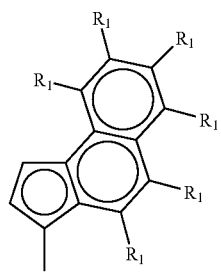

Formula (2)

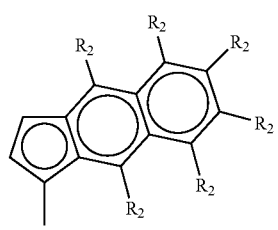

Formula (3)

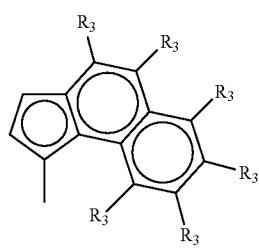

Formula (4)

in the formulae (2), (3) and (4), each of $R_1$ to $R_3$ which are independent of one another, is hydrogen, a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group), the plurality of each of $R_1$, $R_2$ and $R_3$ may be the same or different from one another, and adjacent two $R_1$ or $R_2$ may together form a 5- to 8-membered aromatic or aliphatic ring;

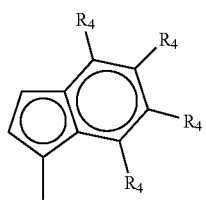

Formula (5)

in the formula (5), each $R_4$ is hydrogen, a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group), and the plurality of each of $R_4$ may be the same or different from one another.

10. The cross copolymer of claim 1, wherein the olefin is ethylene.

11. The cross copolymer of claim 6, wherein the aromatic polyene compound is divinylbenzene.

12. The cross copolymer of claim 1, wherein the anionically polymerizable vinyl compound monomer is an aromatic vinyl compound monomer.

13. The cross copolymer of claim 1, wherein the aromatic vinyl compound in the olefin/aromatic vinyl compound/aromatic polyene copolymer is styrene and the anionically polymerizable vinyl compound monomer is styrene.

14. The cross copolymer of claim 6, wherein the anionic polymerization initiator is butyllithium.

15. A resin composition comprising the cross copolymer of claim 1 and an aromatic vinyl compound type polymer.

16. A resin composition comprising the cross copolymer of claim 1 and a propylene type polymer.

17. A resin composition comprising the cross copolymer of claim 1, an aromatic vinyl compound type polymer and a propylene type polymer.

18. A resin composition comprising the cross copolymer of claim 1 and a block copolymer type polymer.

19. A resin composition comprising from 70 mass % to 99 mass % of the cross copolymer of claim 1 and from 1 mass % to 30 mass % of a petroleum resin or a hydrogenated petroleum resin.

20. A method of preparing the cross copolymer of claim 1, comprising:
synthesizing the olefin/aromatic vinyl compound/aromatic polyene copolymer by coordination polymerization; and then
polymerizing the anionic polymerizable vinyl compound monomer in the presence of the olefin/aromatic vinyl compound/aromatic polyene copolymer and an anionic polymerization initiator.

21. The method of claim 20, wherein in the coordination polymerization, a single-site coordination polymerization catalyst comprising a transition metal compound of the following formula (1) or (6) and a co-catalyst, is used:

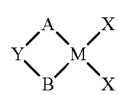

Formula (1)

wherein each of A and B which may be the same or different, is an unsubstituted or substituted cyclopentaphenanthryl group, an unsubstituted or substituted benzoindenyl group, an unsubstituted or substituted cyclopentadienyl group, an unsubstituted or substituted indenyl group, or an unsubstituted or substituted fluorenyl group, where the substituted cyclopentaphenanthryl group, the substituted benzoindenyl group, the substituted cyclopentadienyl group, the substituted indenyl group, or the substituted fluorenyl group, is a cyclopentaphenanthryl group, a benzoindenyl group, a cyclopentadienyl group, an indenyl group, or a fluorenyl group, having at least one substitutable hydrogen atom substituted by a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group);

Y is a methylene group, a silylene group, an ethylene group, a germylene group or a boron group, which has bonds to A and B and which further has, as a substituent, hydrogen or a $C_{1-15}$ hydrocarbon group (this substituent may contain from 1 to 3 nitrogen, oxygen, sulfur, phosphorus or silicon atoms); such substituents may be the same or different from one another; and Y may have a cyclic structure;

X is hydrogen, a hydroxyl group, a halogen, a $C_{1-20}$ hydrocarbon group, a $C_{1-20}$ alkoxy group, a silyl group having a $C_{1-4}$ hydrocarbon group, or an amido group having a $C_{1-20}$ hydrocarbon group; and the two X may have a bond; and M is zirconium, hafnium or titanium;

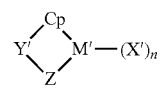

Formula (6)

wherein Cp is an unsubstituted or substituted cyclopentaphenanthryl group, an unsubstituted or substituted benzoindenyl group, an unsubstituted or substituted cyclopentadienyl group, an unsubstituted or substituted indenyl group, or an unsubstituted or substituted fluorenyl group, where the substituted cyclopentaphenanthryl group, the substituted benzoindenyl group, the substituted cyclopentadienyl group, the substituted indenyl group, or the substituted fluorenyl group, is a cyclopentaphenanthryl group, a benzoindenyl group, a cyclopentadienyl group, an indenyl group, or a fluorenyl group, having at least one substitutable hydrogen atom substituted by a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group);

Y' is a methylene group, a silylene group, an ethylene group, a germylene group or a boron group, which has bonds to Cp and Z and which further has, as a substituent, hydrogen or a $C_{1-15}$ hydrocarbon group, such substituents may be the same or different from one another; and Y' may have a cyclic structure;

Z is a group which is a ligand containing nitrogen, oxygen or sulfur and coordinated with M' by the nitrogen, oxygen or sulfur, and which has a bond to Y' and further has hydrogen or a $C_{1-15}$ substituent;

M' is zirconium, hafnium or titanium;

X' is hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group, or a dialkylamido group having a $C_{1-6}$ alkyl substituent; and n is an integer of 1 or 2.

22. The method of claim 20, wherein in the coordination polymerization, a single-site coordination polymerization catalyst comprising a transition metal compound of the following formula (1) and a co-catalyst, is used:

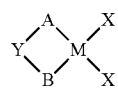

Formula (1)

wherein each of A and B which may be the same or different, is an unsubstituted or substituted cyclopentaphenanthryl group, an unsubstituted or substituted benzoindenyl group, an unsubstituted or substituted cyclopentadienyl group, an unsubstituted or substituted indenyl group, or an unsubstituted or substituted fluorenyl group, where the substituted cyclopentaphenanthryl group, the substituted benzoindenyl group, the substituted cyclopentadienyl group, the substituted indenyl group, or the substituted fluorenyl group, is a cyclopentaphenanthryl group, a benzoindenyl group, a cyclopentadienyl group, an indenyl group, or a fluorenyl group, having at least one substitutable hydrogen atom substituted by a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group);

Y is a methylene group, a silylene group, an ethylene group, a germylene group or a boron group, which has bonds to A and B and which further has, as a substituent, hydrogen or a $C_{1-15}$ hydrocarbon group (this substituent may contain from 1 to 3 nitrogen, oxygen, sulfur, phosphorus or silicon atoms); such substituents may be the same or different from one another; and Y may have a cyclic structure;

X is hydrogen, a hydroxyl group, a halogen, a $C_{1-20}$ hydrocarbon group, a $C_{1-20}$ alkoxy group, a silyl group having a $C_{1-4}$ hydrocarbon group, or an amido group having a $C_{1-20}$ hydrocarbon group; and the two X may have a bond; and M is zirconium, hafnium or titanium.

23. The method of claim 22, wherein a single-site coordination polymerization catalyst comprising a transition metal compound of the formula (1) and a co-catalyst, is used, and in the formula (1), each of A and B which may be the same or different, is an unsubstituted or substituted benzoindenyl group of the formula (2), (3) or (4), or an unsubstituted or substituted indenyl group of the formula (5), and Y is a methylene group or a boron group which has bonds to A and B and which further has, as a substituent, hydrogen or a $C_{1-15}$ hydrocarbon group (this substituent may further contain from 1 to 3 nitrogen, oxygen, sulfur, phosphorus or silicon atoms):

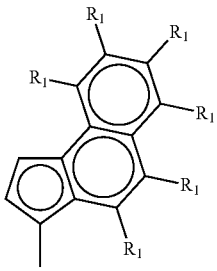

Formula (2)

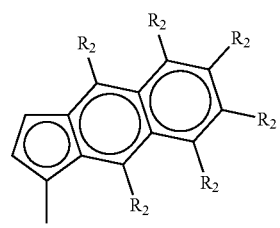

Formula (3)

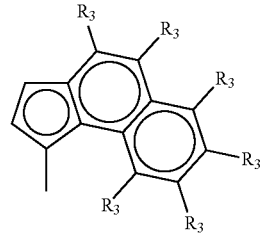

Formula (4)

in the formulae (2), (3) and (4), each of $R_1$ to $R_3$ which are independent of one another, is hydrogen, a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group), the plurality of each of $R_1$, $R_2$ and $R_3$ may be the same or different from one another, and adjacent two $R_1$ or $R_2$ may together form a 5- to 8-membered aromatic or aliphatic ring;

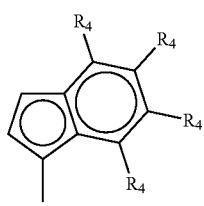

Formula (5)

in the formula (5), each $R_4$ is hydrogen, a $C_{1-20}$ alkyl group, a $C_{6-10}$ aryl group, a $C_{7-20}$ alkylaryl group, a halogen atom, a $OSiR_3$ group, a $SiR_3$ group or a $PR_2$ group (wherein each R is a $C_{1-10}$ hydrocarbon group), and the plurality of each of $R_4$ may be the same or different from one another.

24. The method of claim 20, wherein the anionic polymerization initiator is butyllithium.

* * * * *